US009778718B2

(12) United States Patent
Zacho

(10) Patent No.: US 9,778,718 B2
(45) Date of Patent: Oct. 3, 2017

(54) POWER SUPPLY AND DATA CENTER CONTROL

(75) Inventor: Carl Edvard Martin Zacho, Brenderup (DK)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 495 days.

(21) Appl. No.: 12/370,969

(22) Filed: Feb. 13, 2009

(65) Prior Publication Data
US 2010/0211810 A1 Aug. 19, 2010

(51) Int. Cl.
G06F 1/32 (2006.01)
G06F 9/50 (2006.01)

(52) U.S. Cl.
CPC ............ *G06F 1/3203* (2013.01); *G06F 1/329* (2013.01); *G06F 1/3287* (2013.01); *G06F 9/5088* (2013.01); *G06F 2209/5019* (2013.01); *Y02B 60/1282* (2013.01); *Y02B 60/144* (2013.01); *Y02B 60/162* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
USPC ......... 713/310, 320, 323, 324; 718/104, 105
See application file for complete search history.

(56) References Cited

U.S. PATENT DOCUMENTS

| | | | |
|---|---|---|---|
| 4,747,041 A | 5/1988 | Engel et al. | |
| 4,823,290 A | 4/1989 | Fasack et al. | |
| 5,019,717 A | 5/1991 | McCurry et al. | |
| 5,097,328 A | 3/1992 | Boyette | |
| 5,153,837 A | 10/1992 | Shaffer et al. | |
| 5,216,623 A | 6/1993 | Barrett et al. | |
| 5,367,670 A | 11/1994 | Ward et al. | |
| 5,381,554 A | 1/1995 | Langer et al. | |
| 5,382,943 A | 1/1995 | Tanaka | |
| 5,404,136 A | 4/1995 | Marsden | |

(Continued)

FOREIGN PATENT DOCUMENTS

| | | |
|---|---|---|
| CN | 101098075 A | 1/2008 |
| CN | 102163874 A | 8/2011 |

(Continued)

OTHER PUBLICATIONS

Pinheiro, Eduardo, "Load Balancing and Unbalancing for Power and Performance in Cluster-Based Systems", Internet Citation, May 1, 2001 URL:http://research.ac.upc.es/pact01/colp/paper04.pdf, retrieved on Nov. 17, 2003.

(Continued)

Primary Examiner — Zahid Choudhury
(74) Attorney, Agent, or Firm — Lando & Anastasi, LLP

(57) ABSTRACT

Systems and methods for data center power supply control are provided that identify a parameter of at least one of a plurality of servers that form at least part of a data center that includes an uninterruptable power supply. An estimated parameter of a virtual server can be identified, and one of the plurality of servers can be selected based at least in part on the parameter and the estimated parameter. The virtual server can be provided to the selected server, and the power provided to at least one of the plurality of servers can be reduced, shut down, or otherwise adjusted.

29 Claims, 7 Drawing Sheets

(56) References Cited

U.S. PATENT DOCUMENTS

| | | |
|---|---|---|
| 5,462,225 A | 10/1995 | Massara et al. |
| 5,528,507 A | 6/1996 | McNamara et al. |
| 5,581,478 A | 12/1996 | Cruse et al. |
| 5,682,949 A | 11/1997 | Ratcliffe et al. |
| 5,845,090 A | 12/1998 | Collins, III et al. |
| 5,860,012 A | 1/1999 | Luu |
| 5,949,974 A | 9/1999 | Ewing et al. |
| 5,960,204 A | 9/1999 | Yinger et al. |
| 5,963,457 A | 10/1999 | Kanoi et al. |
| 5,974,237 A | 10/1999 | Shurmer et al. |
| 5,978,594 A | 11/1999 | Bonnell et al. |
| 5,978,912 A | 11/1999 | Rakavy et al. |
| 5,987,614 A | 11/1999 | Mitchell et al. |
| 5,995,729 A | 11/1999 | Hirosawa et al. |
| 6,055,480 A | 4/2000 | Nevo et al. |
| 6,085,243 A | 7/2000 | Fletcher et al. |
| 6,104,868 A | 8/2000 | Peters et al. |
| 6,105,061 A | 8/2000 | Nakai |
| 6,108,782 A | 8/2000 | Fletcher et al. |
| 6,112,235 A | 8/2000 | Spofford |
| 6,134,511 A | 10/2000 | Subbarao |
| 6,141,762 A | 10/2000 | Nicol et al. |
| 6,189,109 B1 | 2/2001 | Sheikh et al. |
| 6,199,204 B1 | 3/2001 | Donohue |
| 6,216,956 B1 | 4/2001 | Ehlers et al. |
| 6,266,721 B1 | 7/2001 | Sheikh et al. |
| 6,281,790 B1 | 8/2001 | Kimmel et al. |
| 6,332,202 B1 | 12/2001 | Sheikh et al. |
| 6,347,627 B1 | 2/2002 | Frankie et al. |
| 6,363,421 B2 | 3/2002 | Barker et al. |
| 6,381,700 B1 | 4/2002 | Yoshida |
| 6,389,464 B1 | 5/2002 | Krishnamurthy et al. |
| 6,457,076 B1 | 9/2002 | Cheng et al. |
| 6,574,104 B2 | 6/2003 | Patel et al. |
| 6,628,009 B1 * | 9/2003 | Chapel ............... 307/14 |
| 6,672,955 B2 | 1/2004 | Charron |
| 6,694,759 B1 | 2/2004 | Bash et al. |
| 6,714,977 B1 | 3/2004 | Fowler et al. |
| 6,718,277 B2 | 4/2004 | Sharma |
| 6,721,672 B2 | 4/2004 | Spitaels et al. |
| 6,745,579 B2 | 6/2004 | Spinazzola et al. |
| 6,795,928 B2 | 9/2004 | Bradley et al. |
| 6,804,616 B2 | 10/2004 | Bodas |
| 6,829,630 B1 | 12/2004 | Pajak et al. |
| 6,859,366 B2 | 2/2005 | Fink |
| 6,859,882 B2 | 2/2005 | Fung |
| 6,862,179 B2 | 3/2005 | Beitelmal et al. |
| 6,964,539 B2 | 11/2005 | Bradley et al. |
| 7,020,586 B2 | 3/2006 | Snevely |
| 7,031,870 B2 | 4/2006 | Sharma et al. |
| 7,032,119 B2 | 4/2006 | Fung |
| 7,047,300 B1 | 5/2006 | Oehrke et al. |
| 7,051,946 B2 | 5/2006 | Bash et al. |
| 7,082,541 B2 | 7/2006 | Hammond et al. |
| 7,091,625 B2 | 8/2006 | Okusawa et al. |
| 7,120,689 B2 | 10/2006 | Gonsalves et al. |
| 7,146,353 B2 | 12/2006 | Garg et al. |
| 7,197,433 B2 | 3/2007 | Patel et al. |
| 7,210,048 B2 * | 4/2007 | Bodas ............... 713/320 |
| 7,251,547 B2 | 7/2007 | Bash et al. |
| 7,292,898 B2 | 11/2007 | Clark et al. |
| 7,313,503 B2 | 12/2007 | Nakagawa et al. |
| 7,315,448 B1 | 1/2008 | Bash et al. |
| 7,389,403 B1 | 6/2008 | Alpert et al. |
| 7,426,453 B2 | 9/2008 | Patel et al. |
| 7,451,336 B2 | 11/2008 | Manuell et al. |
| 7,457,785 B1 * | 11/2008 | Greitzer et al. ........... 706/12 |
| 7,472,043 B1 | 12/2008 | Low et al. |
| 7,558,649 B1 | 7/2009 | Sharma et al. |
| 7,596,476 B2 | 9/2009 | Rasmussen et al. |
| 7,620,480 B2 | 11/2009 | Patel et al. |
| 7,676,280 B1 | 3/2010 | Bash et al. |
| 7,702,485 B2 * | 4/2010 | Gross et al. ............... 702/183 |
| 7,726,144 B2 | 6/2010 | Larson et al. |
| 7,881,910 B2 | 2/2011 | Rasmussen et al. |
| 7,885,795 B2 | 2/2011 | Rasmussen et al. |
| 7,979,250 B2 | 7/2011 | Archibald et al. |
| 8,140,195 B2 * | 3/2012 | Matteson et al. ........... 700/299 |
| 8,195,340 B1 | 6/2012 | Haney et al. |
| 8,335,703 B1 | 12/2012 | Pulier et al. |
| 8,453,471 B2 | 6/2013 | Chapel et al. |
| 8,533,018 B2 * | 9/2013 | Miwa et al. ........... 705/7.13 |
| 8,601,287 B1 * | 12/2013 | Weber et al. ........... 713/300 |
| 9,190,842 B2 * | 11/2015 | Ewing et al. |
| 2001/0005894 A1 * | 6/2001 | Fukui ............... 713/310 |
| 2001/0032109 A1 * | 10/2001 | Gonyea et al. ........... 705/8 |
| 2001/0042616 A1 | 11/2001 | Baer |
| 2001/0047213 A1 | 11/2001 | Sepe, Jr. |
| 2001/0047387 A1 | 11/2001 | Brockhurst |
| 2001/0047410 A1 | 11/2001 | Defosse |
| 2001/0052006 A1 | 12/2001 | Barker et al. |
| 2001/0055965 A1 | 12/2001 | Delp et al. |
| 2002/0004912 A1 | 1/2002 | Fung |
| 2002/0023258 A1 | 2/2002 | Elwahab et al. |
| 2002/0043969 A1 | 4/2002 | Duncan et al. |
| 2002/0055909 A1 | 5/2002 | Fung et al. |
| 2002/0059804 A1 | 5/2002 | Spinazzola et al. |
| 2002/0062454 A1 | 5/2002 | Fung |
| 2002/0071031 A1 | 6/2002 | Lord et al. |
| 2002/0072868 A1 | 6/2002 | Bartone et al. |
| 2002/0112054 A1 | 8/2002 | Hatanaka |
| 2002/0124081 A1 | 9/2002 | Primm et al. |
| 2002/0129355 A1 | 9/2002 | Velten et al. |
| 2002/0161885 A1 | 10/2002 | Childers et al. |
| 2003/0033550 A1 | 2/2003 | Kuiawa et al. |
| 2003/0056125 A1 * | 3/2003 | O'Conner et al. ........... 713/300 |
| 2003/0084357 A1 | 5/2003 | Bresniker et al. |
| 2003/0084358 A1 | 5/2003 | Bresniker et al. |
| 2003/0084359 A1 | 5/2003 | Bresniker et al. |
| 2003/0115000 A1 * | 6/2003 | Bodas ............... 702/60 |
| 2003/0115024 A1 | 6/2003 | Snevely |
| 2003/0120780 A1 | 6/2003 | Zhu et al. |
| 2003/0147216 A1 | 8/2003 | Patel et al. |
| 2003/0154285 A1 | 8/2003 | Berglund et al. |
| 2003/0158718 A1 | 8/2003 | Nakagawa et al. |
| 2003/0188208 A1 | 10/2003 | Fung |
| 2003/0193777 A1 | 10/2003 | Friedrich et al. |
| 2003/0196126 A1 | 10/2003 | Fung |
| 2003/0200130 A1 | 10/2003 | Kall et al. |
| 2003/0200295 A1 | 10/2003 | Roberts et al. |
| 2003/0200473 A1 | 10/2003 | Fung |
| 2003/0204756 A1 | 10/2003 | Ransom et al. |
| 2003/0236822 A1 | 12/2003 | Graupner et al. |
| 2004/0003266 A1 | 1/2004 | Moshir et al. |
| 2004/0010569 A1 | 1/2004 | Thomas et al. |
| 2004/0020224 A1 | 2/2004 | Bash et al. |
| 2004/0065097 A1 | 4/2004 | Bash et al. |
| 2004/0065104 A1 | 4/2004 | Bash et al. |
| 2004/0073597 A1 | 4/2004 | Caveney et al. |
| 2004/0075343 A1 | 4/2004 | Wareham et al. |
| 2004/0075984 A1 | 4/2004 | Bash et al. |
| 2004/0078708 A1 | 4/2004 | Li et al. |
| 2004/0089009 A1 | 5/2004 | Bash et al. |
| 2004/0089011 A1 | 5/2004 | Patel et al. |
| 2004/0163001 A1 | 8/2004 | Bodas |
| 2004/0186905 A1 | 9/2004 | Young et al. |
| 2004/0230848 A1 | 11/2004 | Mayo et al. |
| 2004/0240514 A1 | 12/2004 | Bash et al. |
| 2005/0023363 A1 | 2/2005 | Sharma et al. |
| 2005/0055590 A1 | 3/2005 | Farkas et al. |
| 2005/0071699 A1 | 3/2005 | Hammond et al. |
| 2005/0108582 A1 * | 5/2005 | Fung ............... 713/300 |
| 2005/0114507 A1 | 5/2005 | Tarui et al. |
| 2005/0177755 A1 | 8/2005 | Fung |
| 2005/0185654 A1 | 8/2005 | Zadikian et al. |
| 2005/0198247 A1 | 9/2005 | Perry et al. |
| 2005/0225936 A1 | 10/2005 | Day |
| 2005/0228618 A1 | 10/2005 | Patel et al. |
| 2005/0246431 A1 | 11/2005 | Spitaels |
| 2005/0251802 A1 | 11/2005 | Bozek et al. |
| 2005/0267639 A1 | 12/2005 | Sharma et al. |
| 2006/0047808 A1 | 3/2006 | Sharma et al. |
| 2006/0072262 A1 | 4/2006 | Paik et al. |
| 2006/0080001 A1 | 4/2006 | Bash et al. |

(56) References Cited

U.S. PATENT DOCUMENTS

| | | |
|---|---|---|
| 2006/0112286 A1 | 5/2006 | Whalley et al. |
| 2006/0121421 A1 | 6/2006 | Spitaels et al. |
| 2006/0203834 A1 | 9/2006 | Augustinus |
| 2006/0214014 A1 | 9/2006 | Bash et al. |
| 2007/0038414 A1 | 2/2007 | Rasmussen et al. |
| 2007/0067435 A1* | 3/2007 | Landis et al. ............... 709/224 |
| 2007/0078635 A1 | 4/2007 | Rasmussen et al. |
| 2007/0088822 A1 | 4/2007 | Coile et al. |
| 2007/0150215 A1 | 6/2007 | Spitaels et al. |
| 2007/0150584 A1 | 6/2007 | Srinivasan |
| 2007/0174024 A1* | 7/2007 | Rasmussen et al. ............. 703/1 |
| 2007/0213000 A1 | 9/2007 | Day |
| 2007/0234077 A1 | 10/2007 | Rothman et al. |
| 2007/0271475 A1 | 11/2007 | Hatasaki et al. |
| 2008/0004837 A1 | 1/2008 | Zwinger et al. |
| 2008/0104587 A1* | 5/2008 | Magenheimer et al. ......... 718/1 |
| 2008/0104608 A1 | 5/2008 | Hyser et al. |
| 2008/0174954 A1 | 7/2008 | VanGilder et al. |
| 2008/0177424 A1 | 7/2008 | Wheeler |
| 2008/0177613 A1* | 7/2008 | Chan et al. .................... 705/9 |
| 2008/0186670 A1* | 8/2008 | Lyon et al. .................. 361/687 |
| 2008/0229318 A1 | 9/2008 | Franke |
| 2008/0317021 A1 | 12/2008 | Ives et al. |
| 2009/0106409 A1* | 4/2009 | Murata ....................... 709/223 |
| 2009/0119673 A1 | 5/2009 | Bubba |
| 2009/0121547 A1 | 5/2009 | Paik et al. |
| 2009/0138313 A1 | 5/2009 | Morgan et al. |
| 2009/0138888 A1 | 5/2009 | Shah et al. |
| 2009/0144393 A1 | 6/2009 | Kudo |
| 2009/0150123 A1* | 6/2009 | Archibald et al. ............... 703/1 |
| 2009/0187782 A1 | 7/2009 | Greene et al. |
| 2009/0204826 A1* | 8/2009 | Cox et al. ..................... 713/320 |
| 2009/0206670 A1* | 8/2009 | Whitted et al. ................ 307/64 |
| 2009/0222241 A1* | 9/2009 | Dorogi et al. ................ 702/182 |
| 2009/0228893 A1 | 9/2009 | Behrendt et al. |
| 2009/0249354 A1 | 10/2009 | Yamaguchi et al. |
| 2009/0259345 A1 | 10/2009 | Kato et al. |
| 2009/0276771 A1 | 11/2009 | Nickolov et al. |
| 2009/0316541 A1* | 12/2009 | Takada et al. ............... 369/47.5 |
| 2010/0023940 A1 | 1/2010 | Iwamatsu et al. |
| 2010/0030893 A1 | 2/2010 | Berg et al. |
| 2010/0057935 A1 | 3/2010 | Kawai et al. |
| 2010/0111112 A1 | 5/2010 | Bickel |
| 2010/0131957 A1* | 5/2010 | Kami ........................... 718/104 |
| 2010/0191854 A1* | 7/2010 | Isci et al. ...................... 709/226 |
| 2010/0211669 A1 | 8/2010 | Dalgas et al. |
| 2010/0211810 A1 | 8/2010 | Zacho |
| 2010/0262974 A1 | 10/2010 | Uyeda |
| 2011/0072430 A1 | 3/2011 | Mani |
| 2011/0077795 A1 | 3/2011 | VanGilder et al. |
| 2011/0078474 A1* | 3/2011 | Hatasaki et al. ............. 713/320 |
| 2011/0099403 A1* | 4/2011 | Miyata et al. ................ 713/323 |
| 2011/0107332 A1 | 5/2011 | Bash |
| 2011/0187197 A1 | 8/2011 | Moth |
| 2011/0202728 A1 | 8/2011 | Nichols et al. |
| 2011/0239010 A1 | 9/2011 | Jain et al. |
| 2012/0096169 A1 | 4/2012 | Oeda |
| 2012/0137289 A1 | 5/2012 | Nolterieke et al. |
| 2012/0192007 A1 | 7/2012 | Weilnau, Jr. et al. |
| 2013/0046887 A1 | 2/2013 | Malloy et al. |
| 2013/0211871 A1 | 8/2013 | Ghosh et al. |
| 2013/0247048 A1 | 9/2013 | Le Saux et al. |
| 2014/0215073 A1 | 7/2014 | Dow et al. |
| 2015/0128052 A1 | 5/2015 | Grehan et al. |
| 2015/0204566 A1 | 7/2015 | Dawson et al. |

FOREIGN PATENT DOCUMENTS

| | | | |
|---|---|---|---|
| CN | 102210081 A | | 10/2011 |
| CN | 102272787 A | | 12/2011 |
| WO | 03081406 A1 | | 10/2003 |
| WO | 2006119248 A2 | | 11/2006 |
| WO | 2006124240 A2 | | 11/2006 |
| WO | 2007095144 A2 | | 8/2007 |
| WO | 2008144375 A2 | | 11/2008 |
| WO | 2010093515 A1 | | 8/2010 |

OTHER PUBLICATIONS

International Search Report and Written Opinion from corresponding International Application No. PCT/2010/022074, dated Jul. 27, 2010.

"Management Strategy for Network Critical Physical Infrastructure", White Paper #100, pp. 110, American Power Conversion, Dec. 15, 2003, published on World Wide Web.

Abdlmonem H. Beitelmal et al.: "Thermo-Fluids Provisioning of a High Performance High Density Data Center" Distributed and Parallel Databases, Kluwer Academic Publishers, BO, vol. 21, No. 2-3, Apr. 22, 2006, pp. 227-238, XP019499843, ISSN: 1573-7578.

Abi-Zadeh, Davar et al., "A Transient Analysis of Environmental Conditions for a Mission Critical Facility after a Failure of Power", Arup Mission Criticial Facilities, Feb. 2001, pp. 1-12.

Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.

APC User's Guide Brochure, "InfraStruXure Manager," Mar. 2004, 181 pgs.

ASHRAE, "Thermal Guidelines for Data Processing Environments" 2004, Atlanta: American Society of Heating, Refrigerating, and Air-Conditioning Engineers, Inc., 2004, Atlanta.

Banerjee et al., "Cooling-Aware and Thermal-Aware Workload Placement for Green HPC Data Centers", Aug. 2010, IEEE.

Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.

Chandrakant D. Patel, et al., "Thermal Considerations in Cooling Large Scale High Copute Density Data Centers" IEEE 2002, pp. 767-776.

Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.

Ehsan Pakabaznia et al., "Miminizing data center cooling and server power costs", Proceedings of the 14th ACM/IEEE International Symposium on Low Power Electronics and Design, ISLPED '09, Jan. 1, 2009 (Jan. 1, 2009), p. 145, XP55015368, New York, New York, USA, DOI: 101145/1594233.1594268, ISBN: 978-1-60-558684-7.

Herrlin, M.K., "Rack Cooling Effectiveness in Data Centers and Telecom Central Offices: The Rack Cooling Index (RCI)," ASHRAE Transaction, 2005, pp. 725-731, vol. 111(2).

Innovative Research, Inc., http://web.archive.org/web/20051221005029/http://www.inres.com/, Dec. 21, 2005, published on World Wide Web.

International Preliminary Report on Patentability and Written Opinion from PCT/US2010/023142 dated Aug. 16, 2011.

International Search Report and Written Opinion from corresponding International Application No. PCT/US2011/052561, dated Dec. 27, 2011.

International Search Report for PCT/US2006/16739 dated Oct. 3, 2006.

International Search Report for PCT/US2008/051908 dated Jul. 3, 2008.

International Search Report for PCT/US2009/065700 dated Feb. 18, 2010.

International Search Report for PCT/US2010/023142 dated May 11, 2010.

International Search Report for PCT/US2010/023142, dated May 11, 2010.

International Search Report for PCT/US2010/033867 dated Jul. 7, 2010.

International Search Report for PCT/US2010/033876 dated Jul. 1, 2010.

(56) References Cited

OTHER PUBLICATIONS

International Search Report for PCT/US2011/051866 dated Feb. 24, 2012.

Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007 (Jan. 20, 2007), pp. 193-225, XP019499845, ISSN: 1573-7578, DOI:10.1007/S10619-006-7007-3.

K. Dunlap, "Cooling Audit for Identifying Potential Cooling Problems in Data Centers", White Paper #40, pp. 1-18, American Power Conversion, May 20, 2004, published on World Wide Web.

N. Rasmussen, "Calculating Total Cooling Requirements for Data Centers", White Paper #25, pp. 1-8, American Power Conversion, May 20, 2004, published on World Wide Web.

N. Rasmussen, "Cooling Strategies for Ultra-High Density Racks and Blade Servers", White Paper #46, pp. 1-22, American Power Conversion, Mar. 29, 2005, published on World Wide Web.

N. Rasmussen, "Strategies for Deploying Blade Servers in Existing Data Centers", White Paper #125, pp. 1-14, American Power Conversion, Mar. 29, 2005, published on World Wide Web.

Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.

Sharma, R.K, Bash, C.E, and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.

Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.

Vangilder et al., "Airflow Uniformity through Perforated Tiles in a Raised-Floor Data Center", White Paper 121, Jul. 17-22, 2005, 10 pages.

Vangilder et al., "Capture Index: An Airflow-Based Rack Cooling Performance Metric", 2007, ASHRAE.

Vangilder, James W. et al., "Caputure index: an airflow-based rack cooling performance metric," 2007, ASHRAE Transactions, vol. 113, pp. 126-136.

Vangilder, James W. et al., "Real-Time prediction of rack-cooling performance," 2006, ASHRAE Transactions, vol. 112, pp. 151-162.

S. Niles: "Vidualization: Optimized Power and Cooling to Maximize Benefits", Feb. 4, 2009 (Feb. 4, 2009), pp. 1-27, XP002664678.

* cited by examiner

POWER SUPPLY AND DATA CENTER CONTROL

CROSS REFERENCE TO RELATED APPLICATIONS

This application incorporates herein by reference, in its entirety, U.S. patent application Ser. No. 12/371,355 entitled "Data Center Control," filed on Feb. 13, 2009, and assigned to the assignee of the present application. The referenced application generally discloses systems and methods for controlling data centers.

BACKGROUND OF THE INVENTION

1. Field of Invention

At least one embodiment of the present invention relates generally to power supply and data center control, and more specifically, to energy management in an uninterruptable power supply environment.

2. Discussion of Related Art

In response to increasing demands of industrial, developing, and information based economies, electronic equipment and associated technology networks continue to proliferate across the globe. Uninterruptable power supplies (UPS) can be used to provide power to many different types of electronic equipment. As the number, type, size, interconnectivity, location, and complexity of electronic equipment continues to grow and expand, so can costs associated with their operation. These costs include energy cost associated with power usage.

SUMMARY OF THE INVENTION

At least one aspect is directed to a method of data center power supply control. The method identifies a parameter of at least one of a plurality of servers that form at least part of a data center that includes an uninterruptable power supply. An estimated parameter of a virtual server can be identified, and one of the plurality of servers can be selected based at least in part on the parameter and the estimated parameter. The virtual server can be provided to the selected server, and the power provided to at least one of the plurality of servers can be adjusted.

At least one other aspect is directed to a data center power supply control system. The system includes a data center having an uninterruptable power supply and a plurality of servers. A data center controller can identify a parameter of at least one of the plurality of servers and can identify an estimated parameter of a virtual server. The data center controller can also add the virtual server to a first server of one of the plurality of servers based at least in part on the parameter and the estimated parameter. The data center controller can adjust an amount of power provided from the uninterruptable power supply to the first server and to a second server of one of the plurality of servers.

At least one other aspect is directed to a computer readable medium having stored thereon sequences of instructions. The sequences of instructions include instructions that, when executed by a processor, can cause the processor to identify a parameter of at least one of a plurality of servers that form at least part of a data center, the data center including an uninterruptable power supply. The instructions can also cause the processor to identify an estimated parameter of a virtual server, and to select one of the plurality of servers as a selected server for the virtual server based at least in part on the parameter and the estimated parameter. The instructions can cause the processor to provide the virtual server to the selected server; and to adjust the uninterruptable power supply to adjust power provided to at least one of the plurality of servers.

At least one other aspect is directed to a data center control system. The system can include a first data center having a first uninterruptable power supply and a second data center having a second uninterruptable power supply, each data center associated with a network, and each data center including a plurality of servers. A data center controller associated with the network can identify parameters of the first data center and the second data center, and can identify an estimated parameter for execution of an application on a virtual server. The data center can evaluate the parameters of the first data center and the second data center and the estimated parameter, and can transfer the virtual server from a server of the first data center to a server of the second data center based at least in part on the evaluation. The first uninterruptable power supply can decrease power to the server of the first data center responsive to the transfer of the virtual server.

At least one other aspect is directed to a method of data center control. The method can identify parameters of a first data center and a second data center, each data center including a plurality of servers. An estimated parameter for execution of an application on a virtual server can be identified, and the virtual server can be transferred from a server of the first data center to a server of the second data center based at least in part on an evaluation of the parameters of the first data center and the second data center and the estimated parameter. At least part of an uninterruptable power supply associated with the server of the first data center can be reversibly shut down.

In various embodiments, power provided to the selected server can be increased, and power provided to at least one of the plurality of servers that is a different server than the selected server can be decreased. A portion of the uninterruptable power supply that provides power to at least one of the plurality of servers that may be a different server than the selected server can be shut down. In some embodiments, an application can be provided to the virtual server. A temperature of the selected server may also be adjusted. In one embodiment, a portion of a cooling unit associated with at least one of the plurality of servers that may be a different server than the selected server can be shut down.

In some embodiments, a request for an amount of power can be generated based in part on the estimated parameter, and the requested amount of power can be provided to the selected server. In an embodiment, a simulated parameter of at least one of the plurality of servers can be identified, and at least one of the plurality of servers can be selected based at least in part on the simulated parameter. In one embodiment, an estimated life of at least one data center component can be identified, and a data center maintenance schedule can be created based at least in part on the estimated life.

In some embodiments, a measured parameter of at least one of the plurality of servers can be determined. An estimated future power requirement of at least one of the plurality of servers for a period of time that is at least one of: less than one second, between one and ten seconds, and greater than 10 seconds can also be determined. In one embodiment, the virtual server can be relocated from a first server to a selected server, and a parameter of a cooling unit of a data center can be adjusted to adjust or maintain a temperature of at least one server.

Other aspects, embodiments, and advantages of these exemplary aspects and embodiments will become apparent from the following detailed description, taken in conjunction with the accompanying drawings, illustrating the principles of the invention by way of example only. It is to be understood that the foregoing information and the following detailed description include illustrative examples of various aspects and embodiments, and are intended to provide an overview or framework for understanding the nature and character of the claimed aspects and embodiments. The drawings, together with the remainder of the specification, serve to explain principles and operations of the described and claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
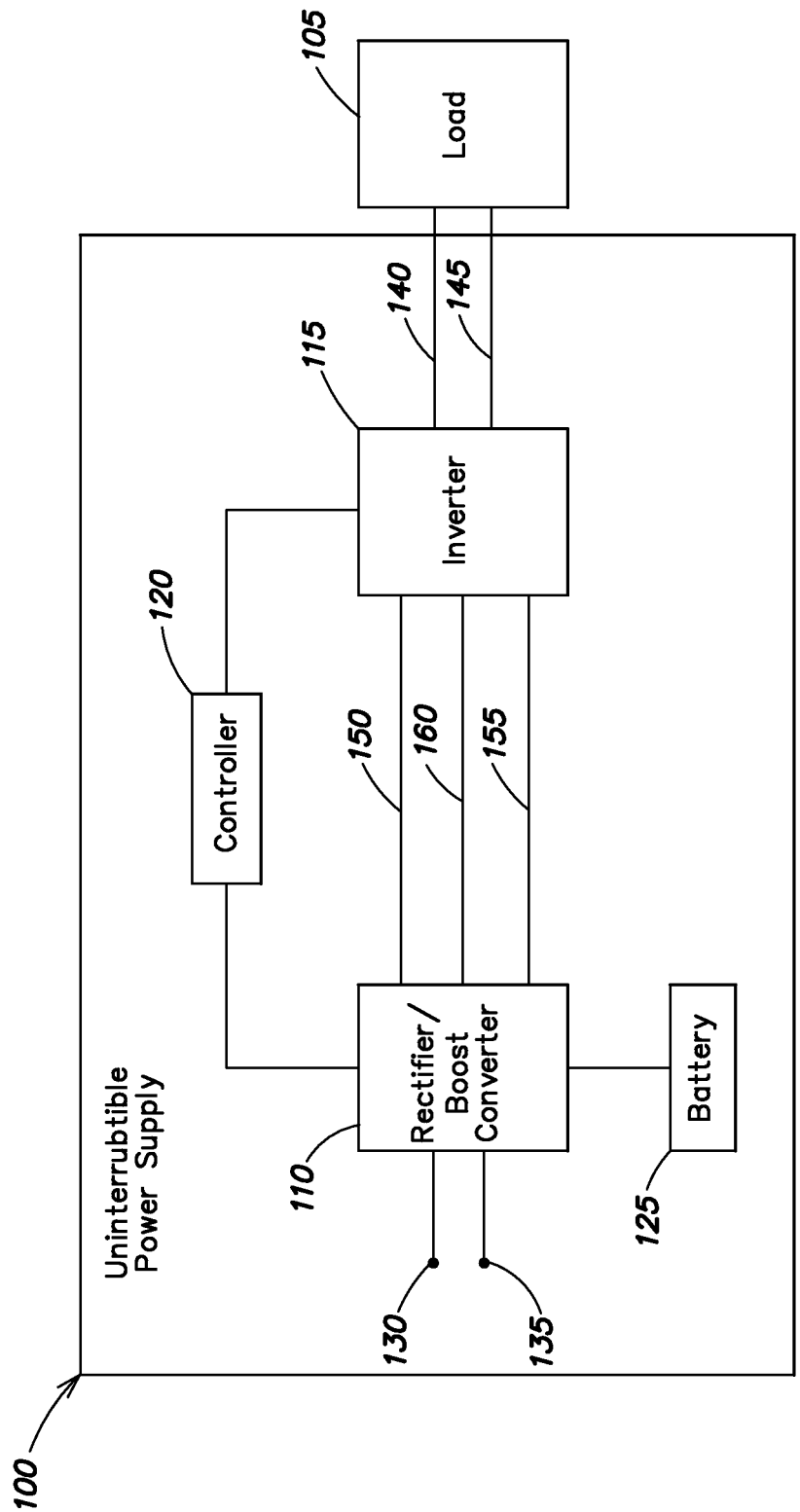
FIG. 1 is a functional block diagram depicting an uninterruptible power supply in accordance with an embodiment.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter and equivalents thereof as well as additional items.

Various aspects and embodiments are directed to power supply control of data centers that may include servers and power supplies. Parameters of server, virtual server, and power distribution to servers and other data center components can be identified, monitored, or estimated by one or more data center controllers. These server parameters, virtual server estimated parameters, and power distribution parameters may be evaluated to identify and select a server suitable for the virtual server. The virtual server may be provided to the selected server, and an uninterruptable power supply of the data center may be adjusted to balance or control power distribution across the servers of one or more data centers, including the selected server that may have received the virtual server. The server parameters and the virtual server estimated parameters may include monitored or simulated parameters.

FIG. 1 is a functional block diagram depicting uninterruptible power supply (UPS) 100 in accordance with an embodiment. In one embodiment, on-line UPS 100 provides regulated power as well as back-up power to at least one load 105. UPS's similar to UPS 100 as illustrated in FIG. 1 are available from American Power Conversion (APC) Corporation of West Kingston, R.I. UPS 100 may include a rectifier/boost converter 110, an inverter 115, a controller 120 and a battery 125. In one embodiment, UPS 100 has inputs 130 and 135 that can couple respectively to line and neutral terminals of an input AC power source. UPS 100 may also include outputs 140 and 145 to provide an output line and neutral to load 105.

In some embodiments, UPS 100 can operate in a line mode, and rectifier/boost converter 110 can receive the input AC voltage and provide positive and negative output DC voltages at output lines 150 and 155 with respect to a common line 160. In some embodiments, UPS 100 can operate in a battery mode. For example, UPS 100 may operate in a battery mode upon loss of input AC power. In this example, rectifier/boost converter 110 may generate DC voltages from battery 125. Common line 160 may be coupled to input neutral line 135 and output neutral line 145 to provide a continuous neutral through UPS 100. In this example, inverter 115 may receive the DC voltages from rectifier/boost converter 110 and provide an output AC voltage at lines 140 and 145.

UPS 100 is a representative uninterruptable power supply and various embodiments described herein are not limited to power supplies such as UPS 100. Various other power supplies may be used that, for example, connect and provide power to electronic equipment, are not uninterruptable, are auxiliary, that utilize predictive voltage or current control, or proportional-integral voltage control with lead lag compensators, that utilize isolation transformers to charge battery 125, or that utilize non-isolated chargers with bi-polar inputs to charge battery 125. Further, various power supplies that may be used herein may use hydrogen fuel cells as an alternative or supplement to battery 125, and uninterruptable power supplies can include either stand alone devices or may form part of other electronic equipment such as a computer.

Figure 2:
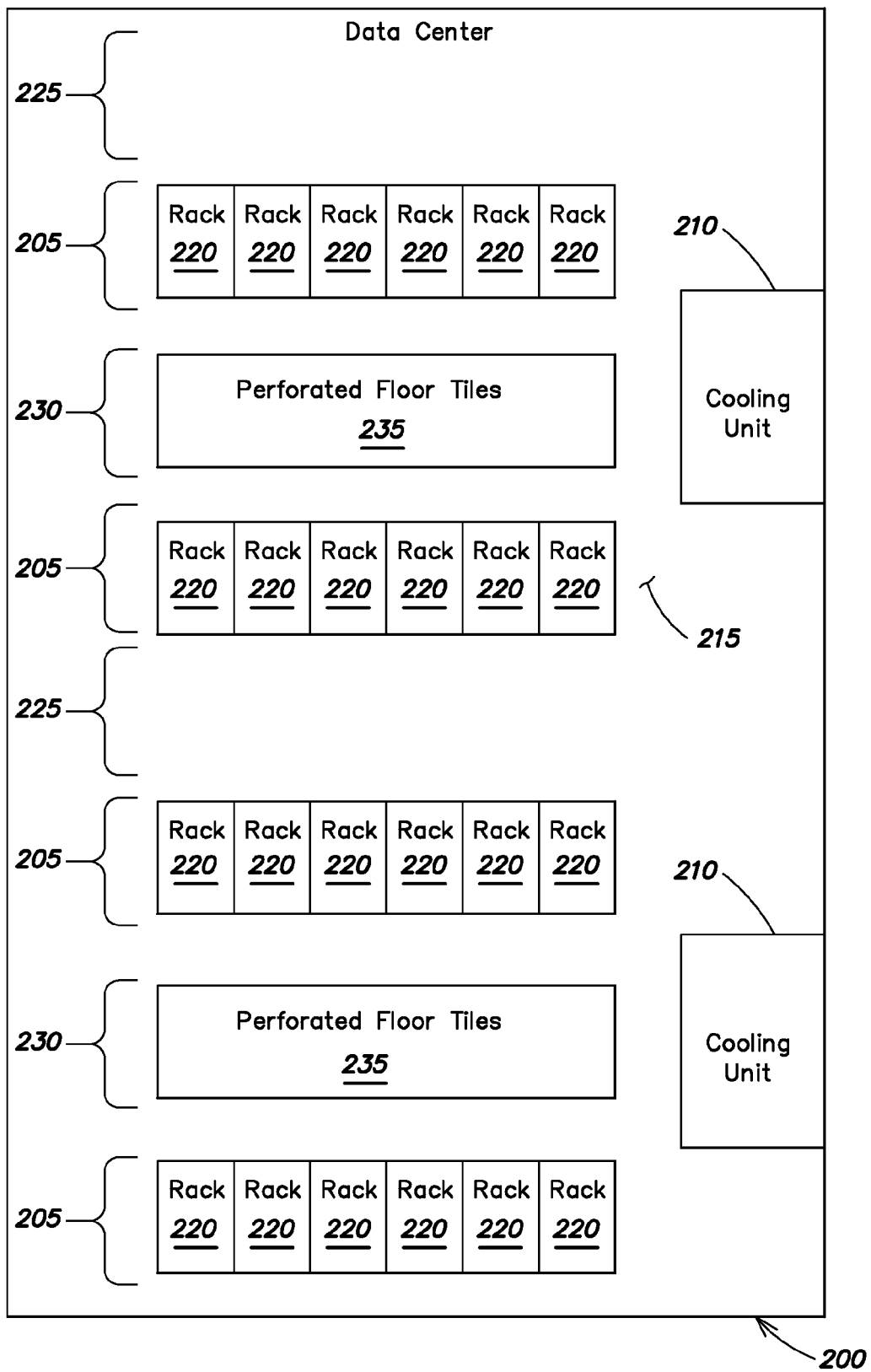
FIG. 2 is a top view depicting a data center in accordance with an embodiment.

Embodiments described herein may be used to design, manage, control and retrofit at least one data center, such as data center 200, which is illustrated in FIG. 2. Data center 200 may include various resources, equipment, or devices that support or ensure data center component functionality. Examples of data center 200 resources include power, power supply, cooling, physical space, weight support, remote equipment control capability, physical and logical security and physical and logical network connectivity. Power data center resources may include power distribution resources, such as transformers, power distribution units, uninterruptable power supplies including UPS 100, outlets, and power available for distribution, such as utility power supplied to data center 200, power generated by an onsite generator and power supplied by power distribution units. Physical space resources in data center 200 may include data center floor space and rack U space. Cooling resources in data center 200 may include cooling distribution capacity and cooling generation capacity. Physical security resources in data center 200 may include security cameras and door locks. Logical network connectivity resources in data center 200 may include Virtual Local Area Networks, Domain Name Services, and Dynamic Host Configuration Protocol Services. Physical network connectivity resources may include network cabling and patch panels. Remote equipment control capability resources in data center 200 may include Keyboard Video Mouse services.

Data center 200 can include one or more rows 205, cooling units 210, and at least one raised floor 215. Rows 205 can include at least one rack 220, which in operation can draw cool air from the front of rack 220 and return warm air to the rear or top of rack 220. In one embodiment, rack 220 may contain U space positions designed to house rack mounted data center components, such as, for example, servers, computers, cooling equipment, subsystems, or network connectivity or other equipment.

In one embodiment, rows 205 of data center 200 can be positioned to create alternating cold aisles and hot aisles. As illustrated in the embodiment of FIG. 2, aisles 225 can be hot aisles and aisles 230 can be cold aisles. To provide cooling to racks 220, in front of each rack 220 in cold aisle 230, perforated floor tiles 235 can be used to provide cooling air from under raised floor 215. In data center 200, in addition to or instead of perforated floor tiles 235, raised floor 215 may include solid floor tiles. Cooling units 210 can provide cool air to the area under raised floor 215 and cooling units 210 can receive warm air from a space adjacent the ceiling of the data center.

In one embodiment, in addition to or in place of cooling units 210, in-row cooling units, such as those available from American Power Conversion (APC) Corporation of West Kingston, R.I. may be used. In one embodiment, half-rack in-row cooling units may be used with, for example, a width of twelve inches, which is approximately half of that of a standard data center rack.

Data centers 200 may include a plurality of different types of servers. For example, a server may be a physical server, a dedicated server, or a virtual server. A physical server generally includes hardware where an operating system is run. A dedicated server generally includes a service application running on a physical server. For example, a dedicated server may include a web service or file transfer protocol (FTP) service on an operating system, where the service application can be coupled to the physical server. A virtual server can include a service that is independent of physical server hardware. For example, a virtual server may include a partitioning of a physical server into multiple servers, each having the appearance and capabilities as if they were running on their own dedicated server. In one embodiment, there can be one dedicated server operating system per physical server and multiple virtual servers per physical server. A virtual server can run concurrent with (e.g., on top of) a dedicated server.

Data center 200 is a representative data center, and various embodiments described herein are not limited to data centers such as data center 200. Various other data centers and facilities may be used that, for example, do not include raised floors. Data center 200 or other data centers may be used with facilities that house more, less, or different equipment, or equipment other than computing equipment, including telecommunications facilities and other facilities. In one embodiment, data center 200 includes a computer supported by a subsystem. Data center 200 may, but need not, be a dedicated space or room. Further, data center component layouts need not be neatly arranged as illustrated in FIG. 2.

Figure 3:
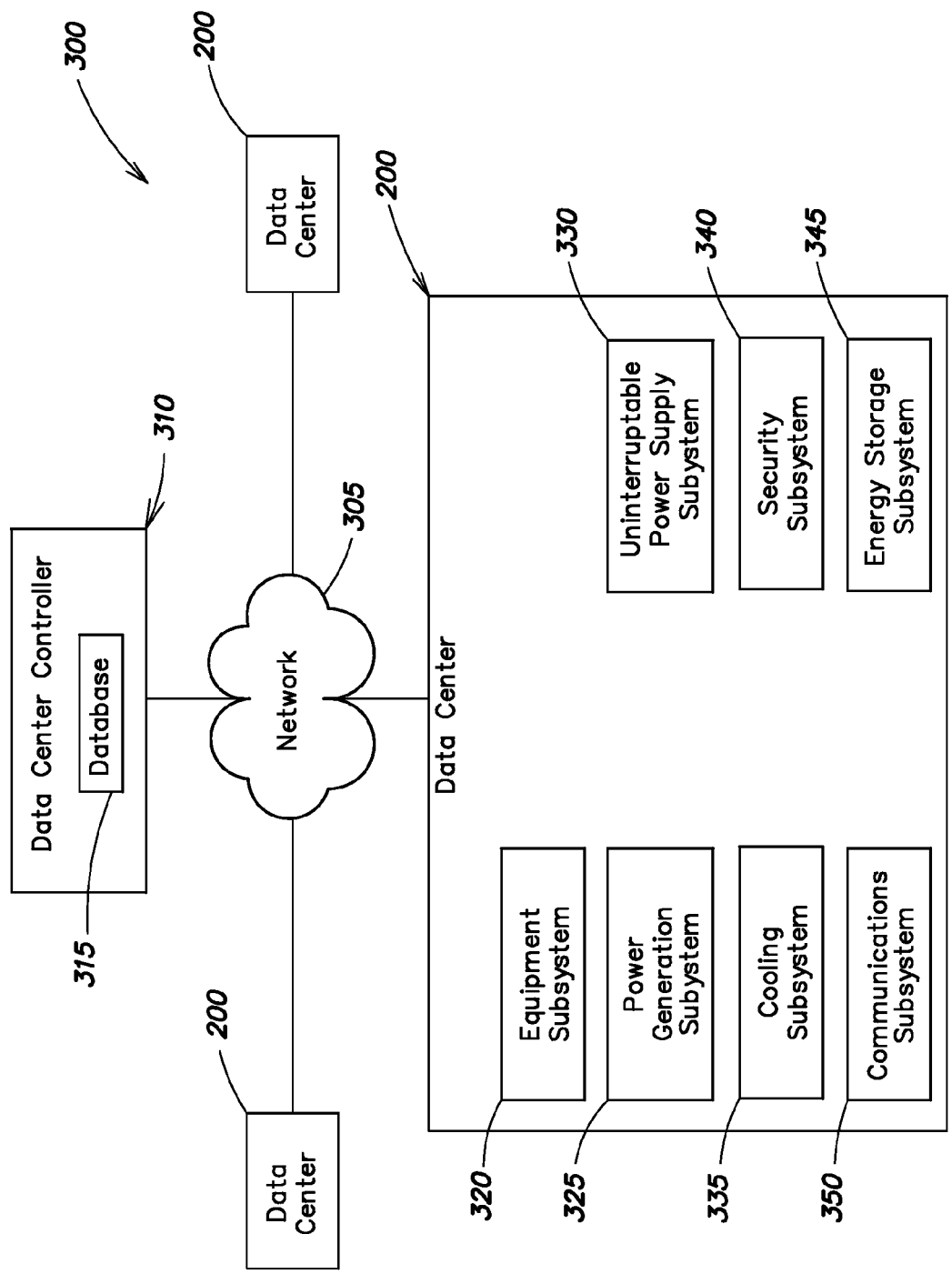
FIG. 3 is a block diagram depicting an example of a data center control system in accordance with an embodiment.

FIG. 3 is a block diagram depicting an example of a data center control system 300 in accordance with an embodiment. In one embodiment, system 300 includes at least one data center 200. A plurality of data centers 200 can be associated with each other via at least one network 305 and at least one data center controller 310. Network 305 can include at least one network of interconnected computers such as the Internet, any wide, local, metro, wireless, telephone, cellular, satellite, or other area networks, or combinations thereof. Network 305 may include network infrastructure equipment such as servers, routers, nodes, or switches, for example. In one embodiment, data center 200 components interconnect with each other or with data center controller 310 via at least one network 305. Servers in data center 200 and network infrastructure devices of network 305 may be grouped into network zones or clusters so that network 305 security remains intact during and after server additions or changes.

In one embodiment, data center controller 310 monitors characteristics of data center components, including physical servers and power supply systems. Data center controller 310 can also monitor virtual server parameters. Based on server, virtual server, and power supply information, data center controller 310 can allocate virtual servers to one or more physical servers to control power distribution within or between data centers and their components.

In various embodiments, data center controller 310 can be located within one or more data centers 200, or remotely located external to data centers 200. For example, data center controller 310 may be located external to data center 200 and connected to data center 200 via network 305. In one embodiment data center controller 310 includes a device such as a processor, microchip, or circuit to identify, manage, and control data center characteristics. In one embodiment, data center controller 310 can receive data related to at least one data center 200. For example, data center controller 310 may receive, measure, estimate, or monitor data indicative of data center 200 load, temperature, capacity, power or current draw, or other data indicating an operational state of data center 200 or any of its components. In one embodiment, data center controller 310 can simulate data center 200 operation. In this embodiment, data center characteristics may be based on simulated or estimated—as opposed to measured—data center conditions such as load, power, temperature, capacity, or energy data. This simulated data may be either generated or received by data center controller 310.

Data center controller 310 may also contain data indicating maximum tolerances, loads, or capacities of data center 200. In one embodiment, at least one database 315 stores data indicating tolerances, loads, or maximum capacity of data center 200 or any data center 200 components. Database 315 may be part of data center controller 310 or may be located elsewhere and accessible to data center controller 310 via, for example network 305. Database 315 may include data from more than one data center 200. In one embodiment, each data center 200 includes at least one database 315 that stores data indicating data center 200 information, such as tolerance or capacity ranges, or data regarding power distribution. Data center controller 310 in one embodiment may include an InfraStruXure® managing platform available from American Power Conversion Corporation® of West Kingston, R.I.

In various embodiments, data center controller 310 determines real-time, near real time, or estimated future parameters of components of one or more data centers 200. For example, data center controller 310 can determine if data center 200 is operating at power capacity. Data center controller 310 can also determine or receive information indicating the operational state of individual devices, components, or subsystems of data center 200. For example, data center 200 may include a plurality of servers. Directly or via network 305, data center 200 may provide data to data center controller 310 indicating that a particular server in data center 200 is not operating at power capacity and therefore may be capable of executing additional applications.

In one embodiment, data center controller 310 determines power distribution across data center components, such as servers. For example, data center controller 310 may identify parameters such as power draw of a plurality of servers located in one or more data centers 200. In one embodiment, data center controller 310 may identify or determine an estimated future power requirement of a server, should that server execute certain applications, or should that server be provided with a virtual server that may execute applications.

In one embodiment, data center 200 includes one or more subsystems. Subsystems may include one or more data center components that collectively perform certain functions. For example, data center 200 may include a power supply subsystem having one or more power supply units, power distribution units, branch circuits, or power storage units. Collectively, the power supply subsystem may distribute power to all or part of at least one data center 200. Examples of subsystems include one or more equipment subsystems 320, power generation subsystems 325, uninterruptable power supply subsystems 330, cooling subsystems 335, security subsystems 340, energy storage subsystems 345, and communications subsystems 350. As illustrated in the embodiments of FIGS. 1 to 3, cooling subsystem 335 may include one or more cooling units 210 to regulate the temperature of data center 200 or at least some of its components. In another example, equipment subsystem 320 may include servers or other logic devices that perform computing functions. In another example, uninterruptable power supply subsystem 330 may include uninterruptable power supply 100.

In one embodiment, communications subsystem 350 includes computer hardware that provides data to data center controller 310 via network 305. For example communications subsystem 350 may indicate that equipment subsystem 320 of data center 200 is operating at 80% of its power capacity based at least in part on, for example, power draw from uninterruptable power supply subsystem 330 or from power generation subsystem 325. In another example, communications subsystem 350 may indicate that a particular device, such as a server from equipment subsystem 320, is using 45% of its available power. In this example, uninterruptable power supply subsystem 330 may partially shut down so that less power is provided to the server. In one embodiment, communications subsystem 350 can provide to data center controller 310 maximum, minimum, or tolerance and operational data of data center 200, its associated subsystems, or individual data center components or devices. Communications subsystem 350 may also indicate that data center 200 has or does not have sufficient physical space for the insertion of additional components. In one embodiment, communications subsystem 350 includes at least one database.

Communications subsystem 350 may also indicate the status of data center 200 or its associated subsystems in general. For example, communication subsystem 350 may indicate that a power failure has occurred. A power failure may be due to a failure of the local power grid or a malfunction of a device or subsystem of data center 200, such as power generation subsystem 325 for example. Communications subsystem 350 may then provide information to data center controller 310 indicating that a power failure has occurred.

In one embodiment, data center controller 310 continuously or periodically receives or monitors information about one or more data centers 200. From this information, data center controller 310 can determine the operational status, range, power use, estimated future power use, power draw, and tolerance of data centers 200 as a whole, as well as their individual devices (e.g., servers) or subsystems (e.g., equipment subsystem 320, uninterruptable power supply subsystem 330, or cooling subsystem 335). Based at least in part on the identified information, data center controller 310 may reallocate applications between servers of one or more data centers 200, identify servers of one or more data centers 200 as a location to run an application, or identify a server in data center 200 as a location to add new hardware or a virtual server that can be used to run an application. In one embodiment, the identified information includes simulated or estimated server information, such as current or predicted future power requirements, for example.

For example, a first server in data center 200 may be operating at greater than 90% of its power capacity. This information may be provided from communication subsystem 350 to data center controller 310. A second server may be operating at 5% of its power capacity, and this information may be provided to data center controller 310 as well. In this example, data center controller 310 may identify the power capacity parameters of the first and second servers and may determine that at least part of a power supply associated with the second server can be shut down. In another example, data center controller 310 may identify the second server as a location for one or more virtual servers. These virtual servers may be provided to the second server, where they may execute applications and increase the power draw of the second server, resulting in a more balanced power distribution between the first and second servers. In one embodiment, data center controller 310 may instruct transfer of a virtual server from first server to a second server of data center 200. In this example, transferring a virtual server reduces power draw of the first server, which may allow for at least a partial shutdown of uninterruptable power supply 100 associated with the first server.

In one embodiment, data center controller 310 can identify one or more servers of data center 200 as a location for a virtual server to execute an application. For example, servers of data center 200 may be operating at various capacities with respect to temperature, power, or other parameters. Data center controller 310 can evaluate the parameters of one or more servers of data center 200 to identify a server as a location for a virtual server. In this example, the virtual server may then be provided to this selected server where the virtual server may run or execute applications. In various embodiments, the identification of a server can be based on any combination of temperature, power, current, cooling, energy, security or other server parameters such as location. For example, two servers in data center 200 may be drawing substantially the same amount of power, but may be located in different areas of data center 200 that have different temperatures. Data center controller 310 may identify one of these two servers as a location to add a virtual server to execute a new application because, for example, data center controller 310 evaluates information indicating that increasing the load at one of the two servers can allow cooling unit 210 of cooling subsystem 335 to at least temporarily shut down, thus saving energy costs associated with cooling unit 210. In this example, both servers may be capable of hosting the virtual server, however energy costs make one of the servers a more suitable location.

In one embodiment, data center controller 310 identifies one of two servers as a selected server to receive a virtual server where the two servers are located in geographically disparate data centers 200. For example, data center controller 310 may control two data centers 200 via network 305. In this example, a virtual server may be relocated from a server of a first data center to a server of a second data center based on an evaluation of server parameters and on an evaluation of virtual server parameters. These parameters may include, for example, measured, sampled, periodically sampled, current, simulated, or estimated future power use or cooling requirements of servers and virtual servers.

It should be appreciated that energy costs and other external factors need not be determinative when data center controller 310 identifies a location for a virtual server. Data center controller 310 may evaluate combinations of operational data (e.g., real time data), data center device parameters (e.g., server power consumption, cooling capacity, efficiency, reliability, redundancy, backup run time, tolerances of data centers 200, their subsystems, or individual components), as well as external factors, (e.g., local time, local energy, security, or labor costs) of one or more data centers 200 to identify one or more servers as a location for a virtual server. Determining a location for a virtual server allows for efficient and balanced distribution or redistribution of power to data center 200 components.

In one embodiment, this controlled power distribution allows data center controller 310 to shut down all or part of subsystems including uninterruptable power supply 100 or cooling unit 210. For example, adding a virtual server to a particular server that may already be in operation may enable an application to be run by that virtual server instead of a second server. In this example, that may allow the second server to remain dormant. As the second server remains dormant, its associated subsystems or their components (e.g., uninterruptable power supply subsystem 330) may shut down, thus saving power. In various embodiments, data center controller 310 evaluates combinations of simulated data, such as simulated power consumption, simulated cooling capacity, simulated efficiency, simulated redundancy, and simulated backup run time of one or more data centers 100, their subsystems, or individual components such as servers.

In one embodiment, data center controller 310 provides an overview of data center 200 during operation, and during planned events such as routine maintenance, or unplanned events such as power outages or other unplanned disruptions. In one embodiment, data center controller 310 may determine data center 200 (including components thereof) power and cooling characteristics as described in U.S. patent application Ser. No. 11/342,300 filed Jan. 27, 2006, entitled Methods and Systems for Managing Facility Power and Cooling, which is incorporated herein by reference in its entirety.

In one embodiment, data center controller 310 determines the capacity of a plurality of servers. For example, data center controller 310 may include a processor or logic device such as a circuit or microcontroller that identifies data center capacity. This capacity may include server capacity to run new applications or configure virtual servers, to store or process data, and may indicate actual, minimum, or maximum power capacity of the server. In one embodiment communication subsystem 350 provides to data center controller 310 information regarding data center 200. For example, data center controller 310 may indicate real time capacity of data center 200. A display may provide this information to a technician or person charged with data center 200 management.

In one embodiment, data center controller 310 can sample or monitor servers or other data center 200 equipment to determine parameters such as an operational state (e.g., power draw) and operational range (e.g., capacity) of the equipment. For example, data center controller 310 may indicate that a virtual server provided to a particular server would cause the associated uninterruptable power supply 100 to operate at 95% capacity, and would reduce or eliminate the need for a second power supply 100 to provide power to a second server in the same data center 200 or in a different data center. In this example, the second power supply 100 could shut down and enter a deep sleep mode, or enter a hot standby mode.

In one embodiment, data center controller 310 manages and monitors performance criteria for physical, dedicated, or virtual servers located in data center 200. For example, data center controller 310 may monitor server performance and determine that a server is operating at a certain percentage of its processing capacity, or using a certain percentage of the power capacity of an associated uninterruptable power supply 100. In one embodiment, data center controller 310 maintains and configures network equipment so that servers are located within a particular network, cluster, or zone. Data center controller 310 may also indicate that a server or virtual server is to be added to one or more data centers 200, removed from one or more data centers 200, or moved from one data center 200 to another data center 200.

In one embodiment, redundant applications can run on one or more servers or virtual servers. For example, an application may have a redundancy requirement for backup purposes. Examples of such applications include payroll, accounting, security, investment, banking, or other applications where an application failure is to be generally avoided. In this example, data center controller 310 may identify and manage redundancy capabilities of one or more servers or virtual servers. In one embodiment, one or more data center controllers 310 may be present in one or more physical locations. Data center controllers, or portions thereof such as server managers, may move between physical locations for example by operating on different servers in one or more data centers 200.

In one embodiment, server management operations of data center controller 310 may be implemented on dedicated hardware located in data center controller 310 or in data center 200. Further, the server management features may instruct that an application be provided to a particular server for execution in response to input from a technician, or at a particular time, for example. In one embodiment, data center controller 310 can instruct that all or part of a virtual server be moved from a first server to a second server. In this illustrative embodiment, first and second servers may be located in the same or different data centers 200. In another embodiment, data center controller 310 may instruct that an application be distributed across a plurality of virtual servers located in more than one data center 200.

Data center controller 310 may also include a hardware manager that generally optimizes data center 200 performance by monitoring server or other equipment parameters, energy efficiency, total cost of ownership, maintenance, and disaster events to allocate resources in and between servers of data centers 200. In one embodiment, data center controller 310 may evaluate information regarding changes in server capacity to provide instructions on where to locate a virtual server. Factors considered by data center controller 310 in identifying virtual server locations in one or more servers include power server actual, estimated, and potential usage, power grid outages, maintenance, environmental changes, local time, availability of on-site staff, or increasing or decreasing utilization of data center 200.

In one embodiment, a technician may provide instructions to execute an application, server, or data center 200 operating requirements. For example, a technician may provide parameters to data center controller 310 instructing that no new physical servers are to be added to data centers 200. In this example, data center controller 310 may provide a virtual server to a selected server in data center 200 and identify the virtual server as the location to execute an application. In this example, uninterruptable power supply subsystem 330 can adjust to provide more power to the server that includes the virtual server. Uninterruptible power supply subsystem 330 may then provide less power to other servers, as in this example they do not include the virtual server and are not running its applications. It should be appreciated data center controller 310 thus can adjust power distribution to servers of data centers 200. Such adjustments may include shutting down power distribution systems such as uninterruptable power supply 100. In another example, a technician may provide a maximum power draw for data center 200 or its servers due to an unreliable local power grid that supplies power to data center 200. In this example, data center controller 310 may time shift or distribute applications to servers in any data center 200 to keep a power draw of a particular server or data center 200 below a specified level.

In one embodiment, data center controller 310 provides instructions to move a virtual server from a first server in a first data center 200 to a second server in the first or in a second data center 200. In one embodiment, based at least in part on data center 200 information, data center controller 310 may evaluate virtual server power requirements and power requirements of a plurality of servers to move or provide instructions to move a virtual server to a selected one of the plurality of servers in data center 200. Data center 200 information may include power, cooling, status, and parameter information of data center components, total cost of ownership factors such as labor and energy costs, security, availability demands, and dynamic requirements such as power, cooling, extended runtime, and redundancy requirements. Data center controller 310 may also identify reliability or other requirements of servers, network equipment, or other devices in data centers 200. Examples of these parameters include redundancy, runtime, power usage, processing speed or capacity, heat generation, security, power supply, power demand, and network zones associated with data center devices or applications. In one embodiment, data center controller 310 can evaluate the nature of an application to be executed by a virtual server when identifying or selecting a server to be provided with the virtual server.

Data center controller 310 may include other elements, such as one or more processors or circuits that can monitor parameters, requirements, or usage servers of data centers 200 and virtual servers. In one embodiment, responsive to information received from data centers 200 or their components, data center controller 310 may identify at least one server as a location for a virtual server to execute an application so as to reduce energy consumption by minimizing uninterruptable power supply 100 or cooling unit 210 operation.

In one embodiment, data center controller 310 can identify and track the location of servers. For example, data center controller 310 may be provided with information indicating that a particular server is located in a particular data center 200. Data center controller 310 may optimize the location of servers within data centers by evaluating server, data center 200, power supply, and network 305 information such as parameters, requirements, or other operational status information. In one embodiment, data center controller 310 requests virtual, dedicated, or physical server movement, placement, addition, or relocation. This may be, for example, in response to application requirements, data center 200 operating conditions such as planned or unplanned service or maintenance, or network 305 operating conditions such as power grid outages or temperature. Requests for virtual server movement or relocation may be responsive to power, cooling, or capacity operating conditions of data center 200. Server moves requested by data center controller 310 can distribute or redistribute data center power allocation to increase data center 200 efficiency, reliability, and performance, and can reduce operational power consumption and cost.

In one embodiment, data center controller 310 may identify a particular data center 200, or a particular rack 220 where a server or virtual server may exist or be inserted. For example, data center controller 310 may identify an existing server in data center 200 and instruct that the existing server be modified to include a virtual or dedicated server. In one embodiment, data center controller 310 evaluates information from a plurality of servers and uninterruptable power supplies 100 and identifies a servers that can receive the virtual server with maximum uninterruptable power supply efficiency. In this illustrative embodiment, at least portions of remaining data center 200 physical hardware, cooling subsystems 335, or uninterruptable power supply subsystems 330 can be shut down or put in a lower power standby mode. This conserves energy and reduces data center 200 cooling requirements.

In one example, data center 200 may be arranged in such a manner that cooling unit 210 is ineffective or inefficient. In this example, based on information evaluated by data center 200, such as power data, temperature data, or cooling data, data center controller 310 may identify one or more servers (or other devices) that include virtual servers and generate an undue amount of heat. Continuing with this example, data center controller 310 may identify a server for relocation of the virtual server that is nearer to cooling unit 210. Data center controller 310 may also identify a server that generates an inordinate amount of heat, and in response may transfer one or more virtual servers associated with that physical server to a different location in the same or a different data center 200. This can reduce the strain on the associated cooling unit 210, and may allow at least a portion of the cooling unit or its associated uninterruptable power supply 100 to shut down or operate in a power saving mode.

Data center components may be evaluated to increase data center 200 performance or operation. For example, data center controller 310 may identify an inefficiently operating server. In this example, data center controller 310 may identify a hardware or software upgrade. Data center controller 310 may then proceed to install or request an upgrade of the server.

In one embodiment, data center controller 310 may evaluate data center information to identify or determine available server or uninterruptable power supply capacity. For example, data center controller 310 may identify available capacity of data center 200 as a whole, or of individual data center components such as servers. In this example, data center controller 310 may indicate that available server capacity is available for lease, rent, or sale. In one embodiment, leasing of spare servers takes place via a server capacity leasing system that may be centralized and that can identify and indicate the availability of capacity in one or more servers of data centers 200. In one embodiment, virtual servers may be provided to servers with spare data center capacity to increase data center 200 performance or uninterruptable power supply 100 efficiency. Data center controller 310 may also indicate a need for additional server capacity to run an application, and may import or export virtual servers from one or more data centers 200. It should be appreciated that this additional capacity may function as a commodity. For example, like electricity and other energy resources, server capacity can be sold, leased, traded, or reserved.

In one embodiment, data center controller 310 can determine estimated power distribution from an uninterruptable power supply to the plurality of servers and to the virtual server. For example, data center controller 310 may estimate power distribution to any components, subsystems, devices, or networks associated with one or more data centers 200. In one embodiment, data center controller 310 determines estimated power distribution from uninterruptable power supply 100 to a plurality of servers and at least one virtual server in one or more data centers 200. In various embodiments, data center controller 310 determines estimated single phase or three phase power distribution. For example, data center controller 310 may estimate power distribution for each phase of a three phase power distribution system. In various embodiments, data center controller 310 may determine estimated power distribution from one or more subsystems, branch circuits, UPSs, or PDUs of data centers 200 to one or more data center components, such as data center servers, racks 220, cooling units 210, or subsystems.

In one embodiment, data center controller 310 can estimate power distribution to data center components or associated devices at specified time periods. For example, data center controller 310 may estimate physical server power draw for the next one second interval if a dedicated or virtual server executes an application at the physical server. In various embodiments this time interval may vary. For example, the time interval may be a period of less than one second, between one and ten seconds, or greater than ten seconds. Data center controller 310 may estimate power distribution at other time periods as well.

In one embodiment, data center 200 can be controlled by controller 310 and powered by a three phase power supply where uninterruptable power supply subsystem 330 includes a three phase uninterruptable power supply (UPS). In this example, the three phase UPS can distribute three phase power to power distribution units (PDUs) or circuit breaker panels of data center 200. From the PDUs, the power can be delivered to racks 220 via one or more single phase or three phase branch circuits. In this example, power utilization by data center devices, (e.g., subsystems, servers, or equipment) may be either single phase or three phase, and a server or other equipment may be unaware of the phase it is using. In one embodiment, data center controller 310 may monitor server reported power consumption values from a server of data center 200. In another embodiment, data center controller 310 monitors phase loading within a three phase power system of data center 200. In this embodiment with a three phase power system, data center controller 310 may be provided with phase specific information (e.g., the phase a server is connected to) in addition to any server reported power consumption information that indicates power consumption without specifying a phase.

In one embodiment, available unused UPS capacity of rack 220 or servers therein may be determined. In another embodiment, where for example available unused capacity of a three phase UPS does not provide a sufficiently accurate indication of data center 200 power characteristics, the load of the individual phases at the UPS, at the PDU inputs, and at branch circuits may be determined. For example, in a three phase power distribution system, the power capacity measurement that most efficiently determines data center available capacity may be the branch circuit power capacity, (e.g., the point at which IT devices or other data center components connect to power). In this example, data center components may be single phase and connected to one of the three phases of a three phase UPS power system.

In one embodiment, in addition to the available power capacity at the branch circuit, data center controller 310 may also determine or be provided with available power capacity data of the corresponding phase at the UPS associated with the branch circuit, and with available power capacity data of the corresponding phase of the PDU associated with the branch circuit. In one embodiment, capacity at a branch circuit can be available when capacity is available at the branch circuit itself, and its corresponding phase at both the PDU and the UPS associated with that branch circuit.

It should be appreciated that capacity may become stranded between PDUs, UPSs, and branch circuits. In other words, some data center 200 devices may have available power capacity, but this available capacity may be inaccessible for use by other data center devices. For example, a cabinet such as one of equipment racks 220 may have no IT loads and may have a single phase branch circuit supplied by phase A of a three phase UPS, where the UPS is loaded to 33% with all of this load on phase A. In this example, there is no remaining UPS power for phase A and therefore there would be no available capacity for that rack 220. In this example, rack 220 could be rewired to supply the associated branch circuit from a different phase.

In another example, a rack 220 with no IT loads may have a single phase branch circuit supplied by phase A, where the associated PDU is loaded to 33% with all the load on phase A. In this example, there is no remaining PDU power for phase A and therefore no available capacity for rack 220. In this example, rack 220 could be rewired to supply the associated branch circuit from a different phase.

In another example, a rack 220 with three phase power distribution to the rack 220 rated at 15 kW may be loaded with equipment to a 9 kW capacity distributed equally across all three phases. In this example, each phase would have 2 kW of available capacity, as the power distribution is balanced across the three phases. In this example, although it may appear that 6 kW of capacity is available, (i.e., 15 kW-9 kW,) due to the balanced distribution each phase has 2 kW of capacity, and in this example a device greater than 2 kW could not be installed in rack 220.

It should be appreciated that on many power grids worldwide, data center components can be connected to 230V branch circuits, and that in North America three phase power distribution can connect loads such as data center components with either 120V or 208V. In one embodiment, 120V and 208V loads can be mixed on a branch circuit of data center 200. Both 120V and 230V loads can be associated with a particular phase, and 208V loads can be connected across two phases and can consume current capacity on both phases. Thus, in one embodiment where data center 200 draws power from a North American power grid, capacity at a branch circuit can be determined based on the availability of capacity at the branch circuit, and its associated UPS and PDU on both of the associated phases connected to the load.

In various embodiments, data center 200 control includes information related to both data center 200 power supply and data center 200 power demand. For example, data center controller 310 may manage information regarding the structure of data center 200 such as its power distribution system, its connection with IT loads such as data center servers or other equipment, and the associated phase of the connections.

In one embodiment, data center components, such as servers or other equipment or devices, may include instruments that allow for the reporting of server current and server power consumption information. Further, the physical location of data center components may be stored in a database associated with the component, or another database such as database 315.

In one embodiment, power consumption of rack 220 may be determined based on reported equipment and power consumption information of the equipment that a database indicates is located in rack 220. For example, data center controller 310 may use this reported power consumption from server instrumentation of servers known to be located in a rack 220 of data center 200 to determine power or cooling capacity for the server having the instrumentation, the associated rack 220, or all or part of data center 200.

Server instruments that are built into some servers may provide insufficient information to indicate to data center controller 310 which branch circuit or phase it is connected to. In this example, without this information data center controller 310 may not be able to identify server or rack 220 with available power capacity to receive a virtual server due, for example, to the stranded power capacity situations discussed herein. In this example, instruments may be introduced to data center 200 to provide information to data center controller 310.

In one embodiment, power consumption of a server, rack 220 or other data center components may be determined based at least in part on equipment manufacturer data. For example, when phase connections of equipment are known, the branch circuit, UPS, and PDU capacities may be determined based at least in part on manufacturer supplied equipment parameters. To simplify these determinations, in one embodiment, branch circuits may be dedicated to a server or other data center 200 device or piece of equipment, and branch circuit current loads may also be measured. It should be appreciated that such manufacturer data based power capacity determinations may be insufficient for some higher density data centers due, for example, to a high number of phase connections and branch circuit configurations where a branch circuit may be dedicated to a single device.

In one embodiment, instruments may be implemented throughout a power distribution system. For example, instruments may be introduced into data center 200 with new devices, or existing data center components may be retrofitted. In one embodiment, current can be measured at one or more branch circuits, PDU inputs, and UPS outputs of a power distribution system of data center 200 and this information can be provided to data center controller 310, which can quantify power demand of data center 200 based at least in part on this information. When, for example, data center controller 310 includes a logical representation of interconnections between servers, racks 220, PDUs, and UPSs of data center 200, available power capacity that takes into account the phase loading effects can be determined for all branch circuits of data center 200.

As discussed, data center controller 310 may assist in the deployment of new data center components such as servers, virtual servers, or other IT equipment or devices. In one embodiment, data center controller 310 may identify a location in data center 200 for placement of a device in a way that balances loads between the phases of a three phase power supply. For example, a virtual server may be added to a server, or relocated from one server to another server, to balance loads between three phases of uninterruptable power supply 100. When data center components including virtual servers are added to data center 200, or moved within data center 200, data center controller 310 may indicate that the equipment is to be coupled to underutilized phases of the power system serving data center 200. For example, equipment loads that operate at a power density above an average data center design density could be directed by data center controller 310 to be coupled to phases that are underutilized. Analogously, equipment loads that operate at a power density below an average data center design density could be directed by controller 310 to be coupled to phases that are over utilized. In one embodiment, repeating this phase-utilization based approach for devices including virtual servers added to or moved within data center 200 can optimize phase balance and rack 220 space utilization.

In one embodiment, a failure to deploy data center components in a balanced manner can lead to stranded power capacity that appears to be present in some data center components, such as a PDU, branch circuit, or UPS, but that cannot be utilized due to the configuration of data center components such as its power system, thus reducing data center 200 efficiency and the amount of components that can be deployed.

Balancing the phase utilization of a three phase power supply can effect rack 220 power distribution and data center 200 power density. In one embodiment, data center controller 310 can identify zones of equipment enclosures within data centers 200. For example, with respect to FIG. 2, row 205 may be a zone of data center 200. In this example, data center controller 310 may determine or specify the average rack power or peak to average rack ratio for each zone. Continuing with this example, the peak to average ratio may impact the amount of stranded power capacity that can exist. In one embodiment, data center controller 310 may increase the peak to average ratio to a value 20% larger than the value expected from typical rack 220 variations. This can reduce the amount of stranded power capacity due to imbalances between branch circuits.

In one embodiment, three phase power distribution to rack 220 enables data center controller 310 to assign equipment including virtual servers to different phases of the power to that rack 220, resulting in a balanced application of power phases. In an embodiment with single phase power distribution to rack 220, data center controller 310 may direct relocation of branch circuits between racks 220.

Figure 4:
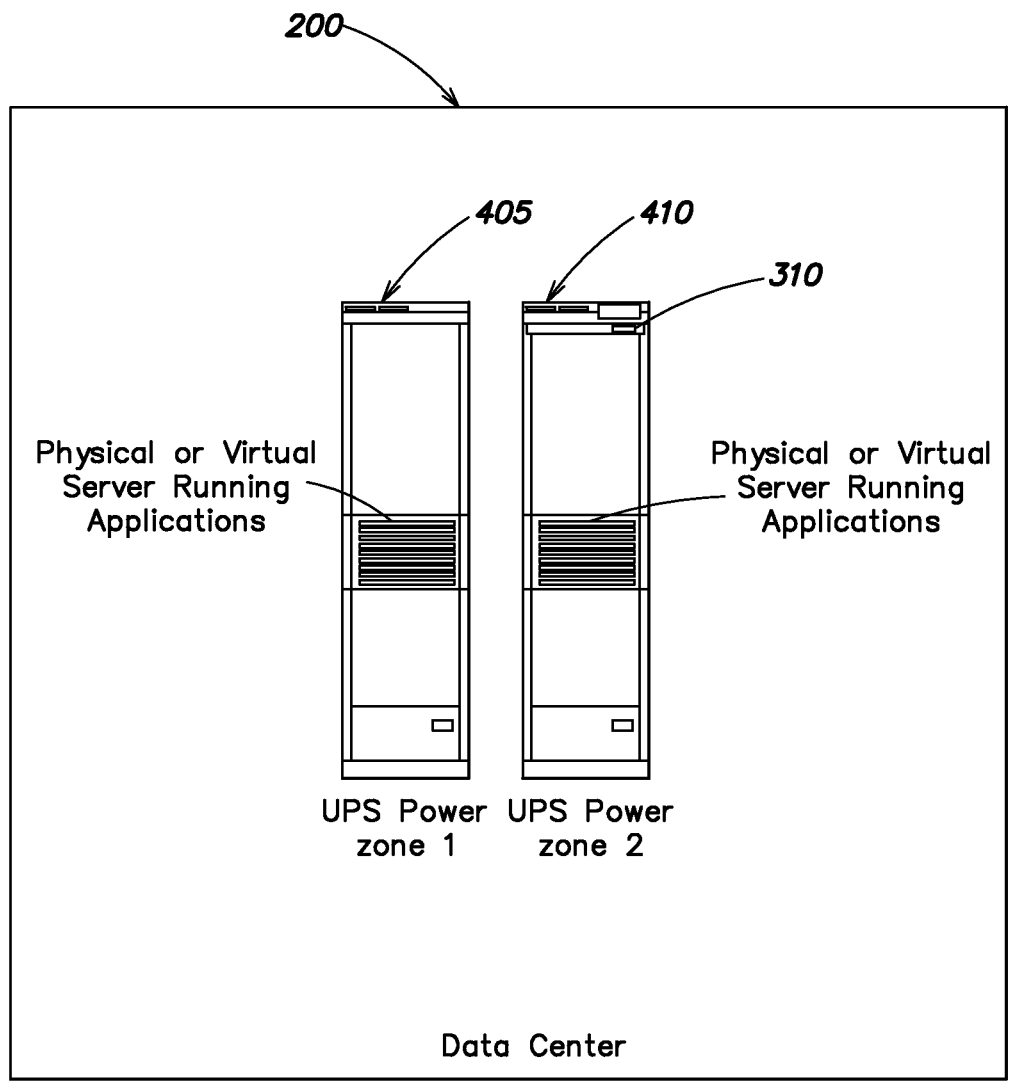
FIG. 4 is a block diagram depicting an example of server configuration in a data center in accordance with an embodiment.

In FIG. 4 there is shown an example of server configuration in data center 200. In one embodiment, FIG. 4 includes first server 405 and second server 410, which, with reference to FIG. 2, may be located in one or more racks 220. First server 405 and second server 410 may each include one or more virtual, physical, or dedicated servers. In one embodiment, with reference to FIG. 3, first server 405 and second server 410 can be physical infrastructure components that form part of network 305.

As illustrated in FIG. 4, second server 410 includes at least part of data center controller 310, which can be implemented as hardware within second server 410. In one embodiment, server and network management operations of data center controller 310 can be implemented in an application run on a virtual or physical server included within first server 405, second server 410, or both. Data centers 200 may include more than one data center controller 310 to provide sufficient levels of redundancy and reliability. For example, as illustrated in FIG. 4, first server 405 can be located in uninterruptable power supply (UPS) zone 1, and second server 410 can be located in UPS zone 2. In one embodiment, both first and second servers 405 and 410 include at least part of data center controller 310 in the form of a virtual or physical server application. In the event of, for example, a power failure in one of the first and second zones, the first or second server 405 and 410 not affected by the power failure, with its associated data center controller 310, can remain in operation. Thus, data center controller 310 may track and optimize physical locations of servers to identify or request virtual server additions or other server moves in the event of power outages, service, or maintenance disruptions.

Data center controller 310 may be provided with parameters such as requirements or operational information of second server 410, as well as those of first server 405 or other servers including virtual servers. In one embodiment, data center controller 310 may instruct one or more of first and second servers 405 and 410 to execute an application based at least in part on server or data center parameters.

With reference to FIGS. 1-4, in one embodiment, uninterruptable power supply subsystem 330 of data center 200 includes at least one uninterruptable power supply 100, and data center 200 can also includes a plurality of servers. Data center controller 310 can identify a parameter of at least one of the servers. For example, data center controller can identify an amount of power drawn by at least one server of data center 200. In various embodiments, the server parameters can include measured or sampled data, for example from server instrumentation. In some embodiments, server parameters may be based on server manufacturer provided data or tolerance data.

In one embodiment, server parameters may be based on simulated server data. This simulated data may be calculated based on known server characteristics and capabilities and not based on measured operational server data. Server parameters may also be based on estimated parameters of future server operation. For example, a server or its associated rack 220 may be operating at a certain percentage of its available power capacity. In this example, data center controller 310 may estimate server power capacity if that server were to be provided with an additional virtual server in order to execute one or more applications. The server parameter may include this estimated server power capacity. In one embodiment, the server parameter includes a measured, simulated, or estimated temperature of the server.

In one embodiment, parameters include measured parameters of one or more servers. Examples of these measured parameters include server power or current draw, heat dissipation, or processing capacity. The parameters may also include estimated future parameters, such as what server power draw is estimated to be at a future time period. For example, power use, (or other parameters) of a server may be measured at a point in time and provided to data center controller 310. In this is example, data center controller 310 may also estimate what that server's future power use will be if a virtual server is provided to that server, or if applications are run on that server in the future.

In one embodiment, the estimated future parameters, such as estimated future power use based on the addition of a virtual server, may include that server's power use at given time periods in the future. For example, estimated future parameters can include power requirements of a server under identified conditions at less than one second in the future, at a time period between one and ten seconds in the future, and at a time period greater than ten seconds in the future. These time periods are examples, and future parameters can be estimated for data center 200 components for other time intervals.

In various embodiments, data center controller 310 can identify estimated parameters of virtual servers. For example, power, temperature, and other resource requirements of virtual servers can be estimated. The estimates may be based on simulated, measured, or known virtual server operational characteristics, including characteristics of applications that may be executed by the virtual servers. In one embodiment, the estimated parameter of a virtual server includes parameters of an application that may be executed by the virtual server. For example, an application may require a certain processing speed, which draws a certain amount of power or produces a certain amount of heat when executed by a processor of the server. In this example, the estimated parameter of the virtual server may include an estimate of the power draw or heat generation of the server should the application be executed by the server.

In one embodiment, data center controller 310 estimates or determines power distribution from uninterruptable power supply 100 to the plurality of servers of data center 200. Data center controller 310 may also estimate or determine single or three phase power distribution from uninterruptable power supply 100 to one or more virtual servers. For example, and as explained above, server or uninterruptable power supply instrumentation may measure server power draw or uninterruptable power supply 100 output. Uninterruptable power supply distribution may also be determined or estimated based on manufacturer supplied data, or simulations of data center operation. In one embodiment, estimations of uninterruptable power supply distribution may be determined at branch circuits or power distribution units of uninterruptable power supply 100.

In one embodiment, data center controller 310 evaluates parameters of a plurality of servers, parameters of one or more virtual servers, and uninterruptable power supply power distribution to identify a server as a location for a virtual server. For example, data center controller 310 may determine that relocating a virtual server from a first server to a second server redistributes uninterruptable power supply 100 power distribution to decrease power provided to the first server and to increase power provided to the second server. In this example, data center controller 310 may determine that the decrease in power required at the first server after relocation of the virtual server allows for at least part of uninterruptable power supply 100 that powers the first server to shut down. In various embodiments, these parts of uninterruptable power supply 100 include its associated PDUs and branch circuits that electrically connect uninterruptable power supply 100 to the first server.

In some embodiments, data center controller 310 selects a server that balances load distribution among servers, or that reduces power requirements of one or more servers. For example, data center controller 310 may evaluate server, virtual server, and power distribution parameters to identify or select a server. In this example, the virtual server may be transferred or relocated from another server to the selected server. Continuing with this example, the server from which the virtual server was transferred may have a reduced power requirement, as it is no longer associated with the virtual server.

In various embodiments, at least part of uninterruptable power supply 100 associated with the server having reduced power requirements may enter a hot standby mode, which lowers power consumption. In another embodiment, where for example further power savings are desired, at least part of uninterruptable power supply 100 associated with the first server may enter a shut down state where, for example, unlike a hot standby mode, in a shut down state only the ability to reactivate uninterruptable power supply 100 by remote may be supported. In one embodiment, the shut down states can be reversible, as uninterruptable power supplies 100 and other data center components can be reactivated. The shut down state generally achieves a power savings that is greater than the hot stand by mode power savings. The shut down mode may also have a reactivation or restart time that is longer than the reactivation time of an uninterruptable power supply 100 in hot standby mode.

In one embodiment, data center controller 310 provides the virtual server to a selected server as discussed. It should be appreciated that the addition of a virtual server to a server of data center 200, or the transfer or relocation of a virtual server between one or more data centers 200, changes the power distribution of various data center components, such as servers and cooling units 210. Thus, data center controller 310 may adjust uninterruptable power supply 100 to balance load distribution, save power, or increase data center efficiency.

Adjustments to uninterruptable power supply 100 can increase power provided to the selected server that includes the virtual server so that the virtual server may, for example, execute applications. In one embodiment, adjustments to uninterruptable power supply 100 can decrease power provided via uninterruptable power supply 100 to one or more of the plurality of servers that were not selected as the location of the virtual server. For example, when the virtual server is relocated from a first server to a second server, data center controller 310 may shut down a portion of uninterruptable power supply 100 that provides power to another server that is not the selected server. Alternatively, data center controller 310 may instruct the portion of uninterruptable power supply 100 that provides a non-selected server with power to enter a hot standby mode. In one embodiment, adjustments to uninterruptable power supply 100 are reversible. For example, uninterruptable power supply 100 can restart from a hot standby mode or a shut down mode. In one embodiment, uninterruptable power supply 100 restarts from the hot standby mode in an amount of time that is less than a restart time from the shut down mode.

In one embodiment, data center controller 310 identifiers estimated parameters of one or more virtual servers. The estimated parameter may include, for example, an estimated amount of power sufficient to execute an application at a virtual server when that virtual server operates at a physical server. In this example, data center controller 310 can provide or direct the application to the virtual server. Data center controller 310 can also control uninterruptable power supply 100 to provide the estimated amount of power to the physical server that receives the virtual server. As such, data center controller 310 controls power distribution within one or more data centers 200 by allocating virtual servers based on power supplies and requirements, and distributing power as appropriate to, for example, balance load distribution or regulate data center temperature.

In one embodiment, a portion of uninterruptable power supply subsystem 330 responsible for power distribution to, for example, a particular rack 220, row 205, or server of data center 200 can be in a deep shut down mode that requires a certain amount of time to repower from the deep shut down mode. In this embodiment, by estimating a power requirement for one of the devices associated with a shut down power supply subsystem 330, data center controller 310 can control restart of that power supply subsystem 330 in advance. In this embodiment, a shut down power supply subsystem 330, (or components thereof) may leave shut down mode and enter an active state based on the estimated parameter so that, for example, a server is active in time to receive a virtual server.

Virtual servers may be newly introduced to servers of data centers 200, and virtual servers may also be relocated between servers to, for example, balance load or temperature parameters. In one embodiment, uninterruptable power supply 100 increases power provided to a first server and decreases power provided to a second server based on relocation of a virtual server from to the first server from the second server. For example, data center controller 310 may direct this relocation in order to balance power distribution between the first and second servers. This virtual server relocation may also occur, for example, to cool down the temperature of or surrounding the second server by reducing its load, or by directing increased cooling subsystem 335 output at or around the second or any other server. In one embodiment, data center controller 310 can shut down at least a portion of cooling subsystem 335 responsible for regulating temperature of one or more servers in one or more data centers 200. For example, the server temperature may maintained, increased, or decreased due to a changed load. For example data center controller 310 can adjust parameters of cooling unit 210 to adjust cooling directed to one or more servers, rows 205, or racks 220.

In various embodiments, data center controller 310 may simulate parameters, or may be provided with simulated parameters. For example, parameters or estimated parameters such as power distribution may include simulated parameters. Simulated parameters may be based on statistical device parameters or tolerances, computer simulation results, or other data not directly measured in real time from data center components. For example, a computer program may simulate operation of one or more data centers based on server and other equipment tolerances, data center size, applications, power requirements, or other information. In one embodiment, parameters or estimated parameters provided to data center controller 310 may include this simulated data. Continuing with this embodiment, data center controller 310 may then direct placement or relocation of a virtual server to one or more servers of one or more data centers 200 based at least in part on the simulated parameter or simulated estimated parameter.

In one embodiment, data center controller 310 can generate estimated operational lifetimes of data centers 200 or their components. For example, data center controller 310 can estimate a lifetime of cooling unit 210 based on parameters of data center components, estimated parameters, statistical data, equipment manufacturer data, or uninterruptable power supply 100 power distribution. In one embodiment, data center controller 310 can generate a maintenance schedule for data center 200 based on the estimated life of data center components. For example, one of cooling units 210 may be operating at or near capacity for a certain time period, which may shorten the lifespan of that cooling unit 210. Data center controller 310 may use this information to schedule a maintenance check of that cooling unit 210 or its associated data center 200.

Figure 5:
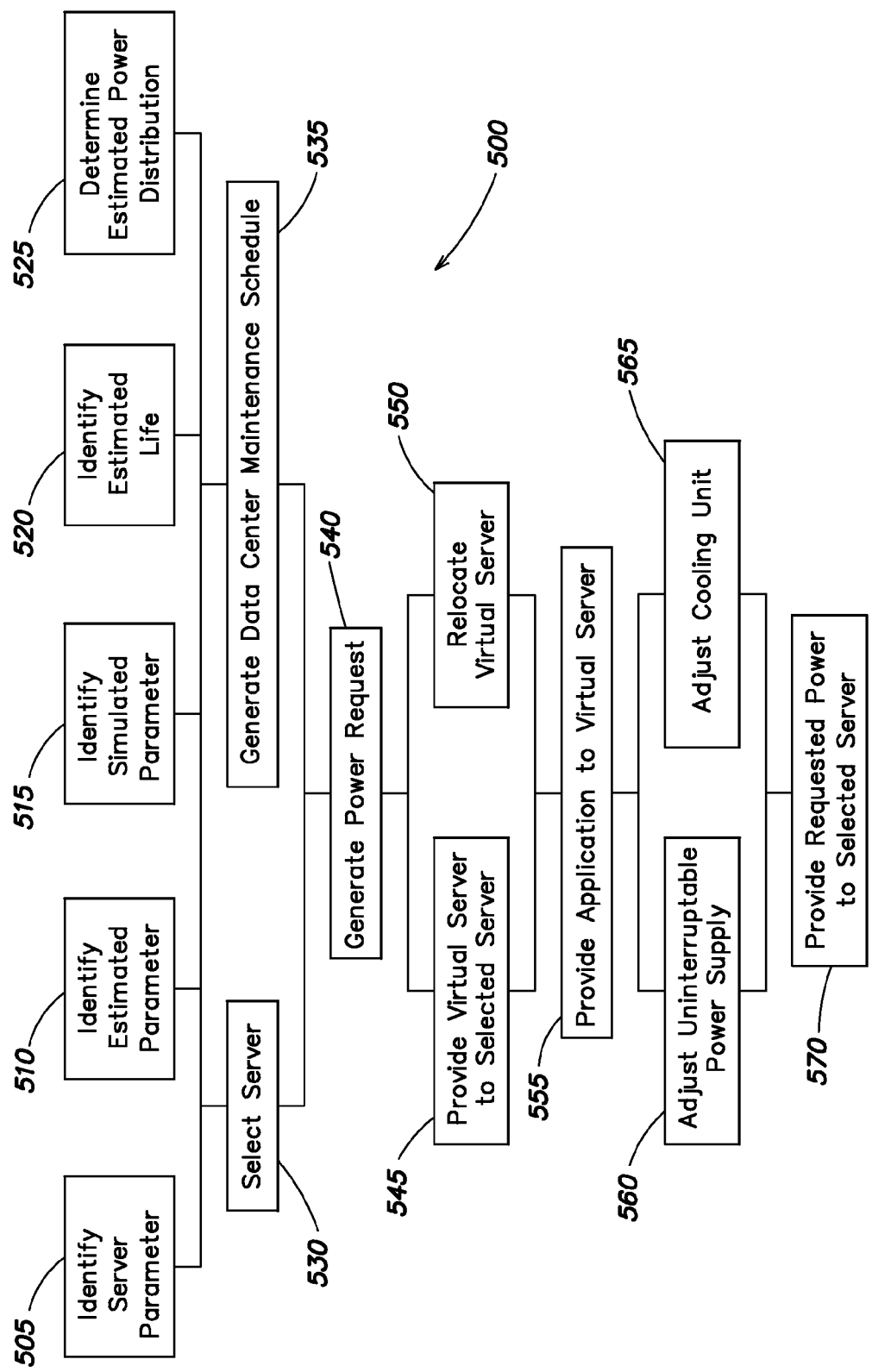
FIG. 5 is a flow chart illustrating an example method of data center power supply control in accordance with an embodiment.

FIG. 5 is a flow chart illustrating an example method 500 for data center power supply control. In various embodiments, method 500 includes a computer implemented method. In some embodiments, method 500 includes a computer implemented method tied to a particular machine explicitly constructed and arranged to execute the acts described herein.

In one embodiment, method 500 includes an act of identifying a parameter of a server (ACT 505). For example, identifying a server parameter (ACT 505) may include identifying a parameter of at least one of a plurality of servers that form at least part of one or more data centers. Identifying server parameters (ACT 505) may include, for example, identifying combinations of operational data (e.g., real time data), server power consumption, cooling capacity, efficiency, reliability, redundancy, backup run time, or tolerances, as well as time, energy, security, or labor costs at a location where a server is physically located. In one embodiment, identifying server parameters (ACT 505) includes identifying power draw of a server in a data center. Identifying server parameters (ACT 505) can also include measuring, sampling, determining, or receiving server parameters such as server operational data, power or processing information. In one embodiment, identifying server parameters (ACT 505) includes identifying parameters of one or more physical, virtual, or dedicated servers.

Method 500 can also include an act of identifying an estimated parameter (ACT 510). Identifying an estimated parameter (ACT 510) may include identifying an estimated parameter of at least one virtual server that forms part of or may become part of one or more data centers. In one embodiment, identifying an estimated parameter (ACT 510) includes identifying virtual server power, cooling, or processing requirements under different operational scenarios. For example, identifying an estimated virtual server parameter (ACT 510) may include identifying an estimated power draw of a physical server if a virtual server is provided to the virtual server and executes an application at the physical server. This may include the estimated power draw of the physical server attributable to the virtual server, or the estimated power draw of the physical server overall.

Identifying an estimated parameter (ACT 510) may include estimating future server or virtual server parameters. For example, identifying an estimated parameter (ACT 510) may include estimating a physical server power requirement a certain number of seconds (e.g., less than one, between one and ten, or greater than ten) in the future based on operating characteristics of the physical server or virtual servers associated with the physical server, or applications capable of execution by the physical server or its associated virtual servers.

In one embodiment, method 500 includes an act of identifying at least one simulated parameter (ACT 515). Identifying a simulated parameter (ACT 515) may include identifying combinations of simulated data, such as simulated power consumption, simulated cooling capacity, simulated efficiency, simulated redundancy, and simulated backup run time of one or more data centers 100, their subsystems, or individual components such as servers. Identifying simulated parameters (ACT 515) may also include identifying statistical device parameters or tolerances, computer simulation results, or other data not directly measured in real time from data center components to, for example, predict a load pattern across devices of one or more data centers. For example, identifying simulated parameters (ACT 515) may include a computer program to simulate operation of one or more data centers based on server and other equipment tolerances, data center size, applications, power requirements, or other information. In one embodiment, identifying server parameters (ACT 505), identifying estimated paramaters (ACT 510), or both, may include identifying one or more simulated parameter (ACT 515).

Method 500 may also include an act of identifying an estimated life of one or more data center components (ACT 520). For example, identifying an estimated data center component life (ACT 520) may include generating an estimated operational lifetime of data centers or their components. Identifying an estimated life (ACT 520) may include determining a lifetime estimate of a cooling unit based on parameters of data center components, estimated parameters, statistical data, equipment manufacturer data, or uninterruptable power supply power distribution, for example.

Method 500 may include an act of determining estimated power distribution (ACT 525). For example, determining estimated power distribution (ACT 525) may include estimating power distribution to components, subsystems, devices, networks associated with one or more data centers. In one embodiment, determining estimated power distribution (ACT 525) includes determining estimated power distribution from an uninterruptable power supply to a plurality of servers and at least one virtual server in one or more data centers. In various embodiments, determining estimated power distribution (ACT 525) includes determining single phase or three phase power distribution. In one embodiment, determining estimated power distribution (ACT 525) includes estimating power distribution for each phase of a three phase power distribution system. Determining estimated power distribution (ACT 525) may include estimating power distribution from one or more subsystems, branch circuits, UPSs, or PDUs of one or more data centers to one or more data center components, such as data center servers, racks, cooling units, or subsystems.

In one embodiment, determining estimated power distribution (ACT 525) includes estimating power distribution to data center components or associated devices at specified time periods. For example, determining estimated power distribution (ACT 525) may include estimating physical server power draw for the next one second interval if a dedicated or virtual server executes an application at the physical server. It should be appreciated that this time interval may vary. For example, the time interval may be a period of less than one second, between one and ten seconds, or greater than ten seconds. Estimating power distribution (ACT 525) may include estimating power distribution at other time periods as well.

In one embodiment, method 500 includes an act of selecting a server (ACT 530). For example, selecting a server (ACT 530) may include selecting one or more servers located in one or more data centers as a location for all or part of a virtual server. In one embodiment, selecting a server (ACT 530) includes selecting one of a plurality of servers as a selected server based at least on part on identifier server parameters, identified estimated parameters of one or more virtual servers, and estimated power distribution from a power supply to the plurality of servers and virtual servers. For example, responsive to an evaluation of parameters, estimated parameters, and power distribution information, a server may be selected (ACT 530) in one or more data centers. In one embodiment, selecting a server (ACT 530) includes selecting a server based at least in part on simulated parameters. Selecting a server (ACT 530) may also include identifying a server in a data center as having capacity sufficient to execute an application.

Selecting a server (ACT 530) may include selecting a server from a plurality of servers to be provided with a virtual server to balance load distribution across the plurality of servers. For example if one server is executing a disproportionate share of applications as compared to other servers in one or more data centers, then another server may be selected (ACT 530) to receive a virtual server from the overly burdened server. In this example, the virtual server may be relocated from the disproportionately busy server to the selected server. In one embodiment, selecting a server (ACT 530) as a location for a virtual server balances loads and cooling requirements across one or more data centers, or among components or subsystems of a single data center.

Method 500 may also include an act of generating a data center maintenance schedule (ACT 535). In one embodiment, generating a maintenance schedule (ACT IS 535) includes generating a data center maintenance schedule based on the estimated life of one or more data center components. For example, an estimated life of an uninterruptable power supply may be identified (ACT 520) as coming to an end in the next 4 to 6 months due, for example, to the power demands of an associated data center. In this example, generating a maintenance schedule (ACT 535) may include alerting a service technician of the need for an inspection of the uninterruptable power supply, or its associated data center. In another example, a cooling unit of a data center may be operating at or near capacity for a certain time period, which may shorten its lifespan. In this example, generating a maintenance schedule may include scheduling a maintenance check of the cooling unit or its associated data center.

Method 500 may include an act of generating a power request (ACT 540). In one embodiment, generating a power request (ACT 540) may include generating a request for an amount of power based at least in part on the estimated parameter of a virtual server. For example, the estimated amount of power that a virtual server may draw to run an application may be determined (ACT 510). In one embodiment, responsive to determining the estimated parameter of virtual server power draw (ACT 510), method 500 may generate a power request (ACT 540) from an uninterruptable power supply to supply power to a selected server associated with the virtual server.

In one embodiment, generating a power request (ACT 540) includes identifying an amount of power needed for a virtual server to operate on a selected server. For example, generating a power request (ACT 540) may include determining an estimated future power requirement for power to be supplied to a selected server at a point in time or within a time period such as within ten seconds of generating the power request (ACT 540). In this example, responsive to the estimated future power requirement, at least a portion of an uninterruptable power supply may reactivate from a shut down mode so that it may provide power corresponding to the estimated future power requirement at the desired time period, such as within ten seconds for example.

Method 500 may also include an act of providing at least one virtual server to at least one selected server (ACT 545). In one embodiment, providing a virtual server to a selected server (ACT 545) may include directing that a selected server receive the virtual server. In an embodiment, providing a virtual server to a selected server (ACT 545) may also include installing the selected server with the virtual server. In a further embodiment, providing a virtual server to a selected server (ACT 545) includes partitioning a physical server into one or more virtual servers, each virtual server having the appearance and capabilities of a dedicated server. Providing the virtual server to the selected server (ACT 545) can enable the virtual server to run or execute applications at the physical location of the selected server, and providing the virtual server to the selected server (ACT 545) or other specific hardware can redistribute a load more precisely among servers of one or more data centers p In one embodiment, method 500 includes an act of relocating the virtual server (ACT 550). For example, relocating the virtual server (ACT 550) may include transferring the virtual server from a first physical or dedicated server to a second physical or dedicated server. The first and second servers in this example may be in the same data center or in two separate data centers that can be at different geographical locations. Relocating the virtual server (ACT 550) can include removing a virtual data center from one server, and adding the virtual server to another server in the same or different data centers. In various embodiments, relocating the virtual server (ACT 550) may also include relocating the virtual server within the same or different racks or rows of one or more than one data centers. In one embodiment, providing the virtual server to the selected server (ACT 545) includes relocating the virtual server from one of a plurality of servers to a selected server (ACT 550).

Method 500 may also include an act of providing an application to a virtual server (ACT 555). In one embodiment, responsive to a generated power request (ACT 540) and providing the virtual server to the selected server (ACT 545), method 500 may include the act of providing one or more applications to the virtual server (ACT 555) for implementation or execution by the virtual server. In this embodiment, by the time an application is provided to the virtual server (ACT 555), appropriate power distribution to the virtual server from, for example, an uninterruptable power supply subsystem may enable the virtual server to execute the application. It should be appreciated, however, that in one embodiment neither generating a power request (ACT 540) nor providing the virtual server to the selected server (ACT 545) is a prerequisite to providing the application to the virtual server (ACT 555). For example, an application may be provided to the virtual server (ACT IS 555) in the absence of a generated power request (ACT 540), as it may be determined that a request for more or less power is not necessary for execution of the application by the virtual server.

In one embodiment, method 500 includes an act of adjusting an uninterruptable power supply (ACT 560). For example, adjusting an uninterruptable power supply (ACT 560) may include adjusting the uninterruptable power supply (UPS) to adjust power provided to at least one of the plurality of servers that may include one or more selected servers. In various embodiments, adjusting the uninterruptable power supply (ACT 560) can include increasing, decreasing, or maintaining power supplied by a UPS to one or more data center components. The power supplied by the UPS may be three phase or single phase power. In one embodiment, adjusting the UPS power (ACT 560) includes balancing three phase power distribution to power distribution units (PDUs) or circuit breaker panels of a data center.

In some embodiments, adjusting the UPS power (ACT 560) includes adjusting power provided to a virtual server. Adjusting the UPS power (ACT 560) can also include adjusting power provided to a server from which a virtual server has been transferred out, i.e., from that server to a different, selected server. For example, adjusting the uninterruptable power supply (ACT 560) may include increasing power provided from the uninterruptable power supply to a selected server. Adjusting the uninterruptable power supply (ACT 560) may also include adjusting power provided to at least one of the plurality of servers that is a different server than the selected server. For example, power provided to one of the servers that is not the selected server may be decreased. In one embodiment, adjusting the uninterruptable power supply (ACT 560) may include shutting down at least a portion of the uninterruptable power supply that provides power to at least one of the plurality of servers that is a different server than the selected server. Shutting down at least a portion of the uninterruptable power supply can include, for example, shutting down at least one of a power distribution unit and a branch circuit of the uninterruptable power supply.

Method 500 may include an act of adjusting a cooling unit of one or more data centers (ACT 565). In one embodiment, adjusting the cooling unit (ACT 565) includes adjusting a parameter of a cooling unit to adjust a temperature of the selected server. For example, adjusting the cooling unit (ACT 565) may include increasing power provided to the cooling unit so that cooling unit output directed toward the selected server increases. Adjusting the cooling unit (ACT 565) may also include decreasing power provided to the cooling unit to decrease cooling capacity of the cooling unit applied to one or more servers that is a different server than the selected server. In various embodiments, adjusting the cooling unit (ACT 565) includes adjusting components of cooling subsystems for one or more data centers.

Method 500 may also include an act of providing the requested amount of power to the virtual server (ACT 570). In one embodiment, the uninterruptable power supply can be adjusted (ACT 560) to generate the amount of power requested (ACT 540). This amount of power may then be provided to the virtual server (ACT 570) so that the virtual server may, for example, execute one or more applications. In one embodiment, providing the requested power to the virtual server (ACT 570) results in a balanced or more balanced load distribution across a plurality of servers in one or more than one data centers. For example, the server that is selected (ACT 530) may be underutilized with respect to other servers in the same or a different data center. This underutilization can result in an unbalanced power distribution across the plurality of servers where, for example the busier servers draw more power than the underutilized servers. This can lead to disparities in heat dissipation throughout data centers or racks and rows thereof, as well as uneven cooling requirements and cooling unit load demands. In one embodiment, providing the requested power to the selected server (ACT 570) rectifies these disparities and makes more efficient use of data center power, cooling, and data processing resources.

It should be appreciated that, while a series of acts has been described with regard to FIG. 5, the order of the acts is nonlimiting and may be modified in other implementations, aspects, and embodiments. Further, non-dependent acts may be performed in parallel.

Various aspects and embodiments described herein may be implemented on one or more computer systems as discussed above. For example, system 300 may be implemented in a single computer system or in multiple computer systems. These computer systems may be, for example, general-purpose computers such as those based on Intel PENTIUM-type processor, Motorola PowerPC, Sun Ultra-SPARC, Hewlett-Packard PA-RISC processors, or any other type of processor.

Figure 6:
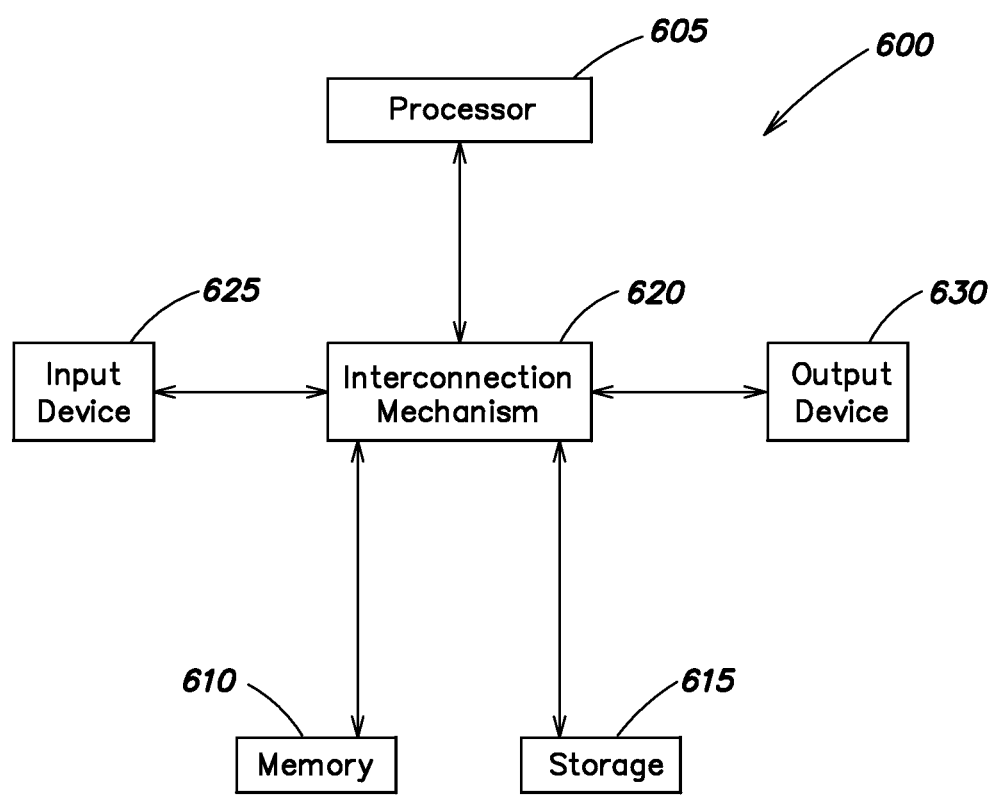
FIG. 6 is a functional block diagram of a computer system in accordance with an embodiment.

For example, various aspects may be implemented as specialized software executing in a general-purpose computer system 600 such as that shown in FIG. 6. The computer system 600 may include a processor 605 connected to one or more memory devices 610, such as a disk drive, memory, or other device for storing data. Memory 610 is typically used for storing programs and data during operation of the computer system 600. The computer system 600 may also include a storage system 615 that provides additional storage capacity. Components of computer system 600 may be coupled by an interconnection mechanism 620, which may include one or more busses (e.g., between components that are integrated within a same machine) and/or a network (e.g., between components that reside on separate discrete machines). The interconnection mechanism 620 enables communications (e.g., data, instructions) to be exchanged between system components of system 600.

Computer system 600 also includes one or more input devices 625, for example, a keyboard, mouse, trackball, microphone, touch screen, and one or more output devices 630, for example, a printing device, display screen, speaker. In addition, computer system 600 may contain one or more interfaces (not shown) that connect computer system 600 to a communication network (in addition or as an alternative to the interconnection mechanism 620).

Figure 7:
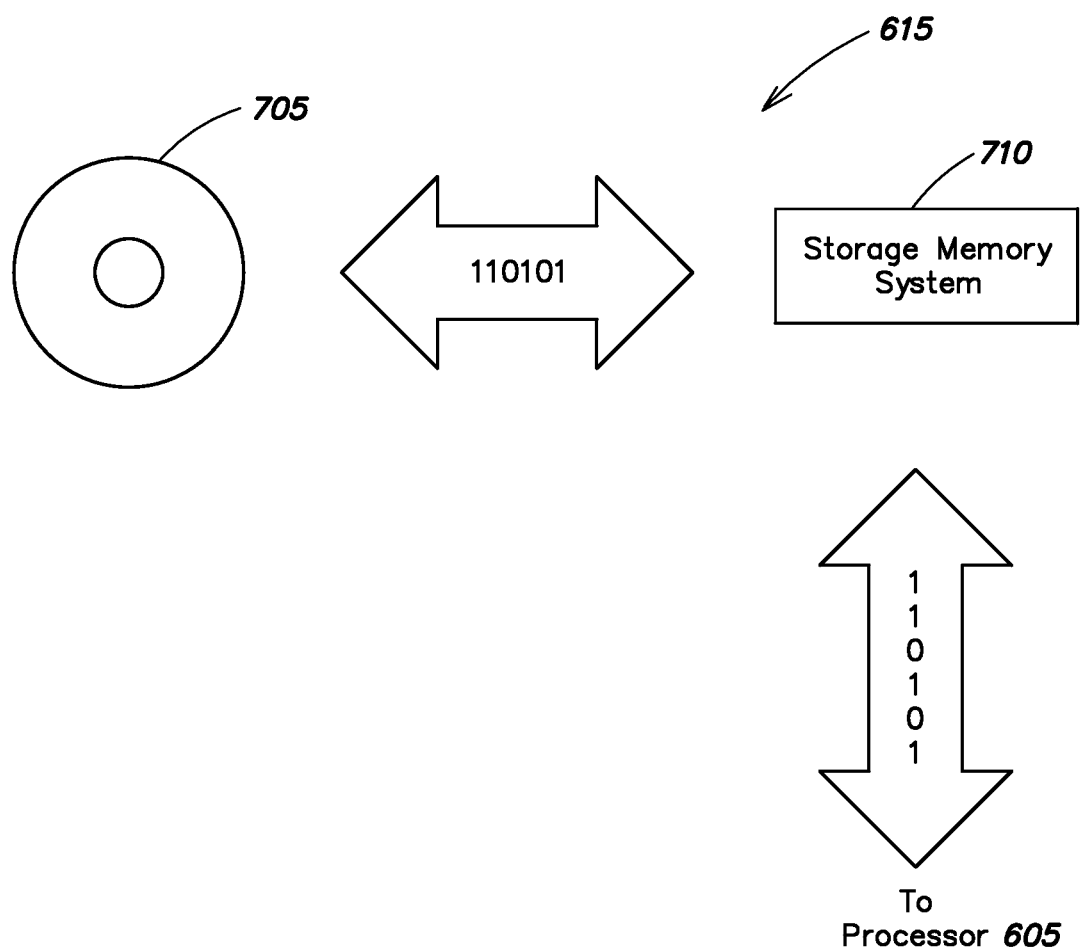
FIG. 7 is a functional block diagram of a storage system in accordance with an embodiment.

The storage system 615, shown in greater detail in FIG. 7, typically includes a computer readable and writeable nonvolatile recording medium 705 in which signals are stored that define a program to be executed by the processor or information stored on or in the medium 705 to be processed by the program to perform one or more functions associated with embodiments described herein. The medium may, for example, be a disk or flash memory. Typically, in operation, the processor causes data to be read from the nonvolatile recording medium 705 into another memory 710 that allows for faster access to the information by the processor than does the medium 705. This memory 710 is typically a volatile, random access memory such as a dynamic random access memory (DRAM) or static memory (SRAM). It may be located in storage system 615, as shown, or in memory system 610. The processor 605 generally manipulates the data within the integrated circuit memory 610, 710 and then copies the data to the medium 705 after processing is completed. A variety of mechanisms may manage data movement between the medium 705 and the integrated circuit memory element 610, 710, and the examples provided herein, including example memory system 610 and storage system 615 are not limiting.

Computer systems implemented herein may include specially-programmed, special-purpose hardware, for example, an application-specific integrated circuit (ASIC). Various aspects described herein may be implemented in software, hardware or firmware, or any combination thereof. Further, such methods, acts, systems, system elements and components thereof may be implemented as part of the computer system described above or as an independent component.

Although computer system 600 is shown by way of example as one type of computer system upon which various aspects described herein may be practiced, it should be appreciated that aspects and embodiments are not limited to being implemented on the computer system as shown in FIG. 6. Various aspects may be practiced on one or more computers having a different architecture or components shown in FIG. 6. Further, where functions or processes of embodiments that are described herein (or in the claims) as being performed on a processor or controller, such description is intended to include systems that use more than one processor or controller to perform the functions.

Computer system 600 may be a general-purpose computer system that is programmable using a high-level computer programming language. Computer system 600 may be also implemented using specially programmed, special purpose hardware. In computer system 600, processor 605 may be a commercially available processor such as the well-known Pentium class processor available from the Intel Corporation. Other processors are available, such as those that can execute an operating system which may be, for example, the Windows 95, Windows 98, Windows NT, Windows 2000 (Windows ME), Windows XP, or Windows Vista operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that embodiments of the systems and methods described herein are not limited to a particular computer system platform, processor, operating system, or network. Also, it should be appreciated that these systems and methods are not limited to a specific programming language or computer system. Other appropriate programming languages and other appropriate computer systems can be used.

One or more portions of the computer system may be distributed across one or more computer systems coupled to a communications network. For example, as discussed above, components of data center controller 310 may be located remotely each other. These computer systems also may be general-purpose computer systems. For example, system 300 elements can be distributed among one or more computer systems configured to provide a service (e.g., virtual servers) to one or more client computers, or to perform an overall task as part of a distributed system. For example, operations may be performed on a client-server or multi-tier system that includes components distributed among one or more server systems that perform various functions according to various embodiments described herein. These components may be executable, intermediate (e.g., IL) or interpreted (e.g., Java) code which communicate over a communication network (e.g., the Internet) using a communication protocol (e.g., TCP/IP). For example, one or more database servers may be used to store device data that is used in designing layouts, and one or more servers may be used to efficiently perform cooling calculations associated with embodiments described herein.

It should be appreciated that aspects and embodiments described herein are not limited to executing on any particular system or group of systems. Also, it should be appreciated that the aspects and embodiments described herein are not limited to any particular distributed architecture, network, or communication protocol.

Various aspects and embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects and embodiments may be implemented in a non-programmed environment (e.g., documents created in HTML, XML or other format that, when viewed in a window of a browser program, render aspects of a graphical-user interface (GUI) or perform other functions). Various aspects and embodiments may be implemented as programmed or non-programmed elements, or any combination thereof.

Systems and methods are described herein that provide indications of remaining cooling capacity for equipment enclosures. The indication of remaining cooling capacity may be a direct indication of remaining cooling in terms of, for example, kilowatts or BTU per hour, or the indication may be indirect such as providing the total capacity of cooling available to an enclosure along with an indication of how much cooling is being used, for example, in terms of percentage. Further, calculated values, including the capture index and the recirculation index may be used to determine the sufficiency of a particular design and to determine additional cooling capacity before a warning or error condition will result.

Note that in FIGS. 1 through 7, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

From the foregoing, it will be appreciated that the aspects and embodiments described herein afford effective data center control. These aspects and embodiments are able to identify a plurality of parameters from servers of more than one data centers and their associated subsystems, devices, and networks. By evaluating these parameters together with estimated parameters of virtual servers, such as their power draw requirements, and with estimated or measured UPS power distribution to data center components including servers and virtual servers, aspects and embodiments can select one or more servers as a location for a virtual server to execute applications to optimize power distribution within or between data servers. This distribution and placement of virtual servers to execute applications increases data center efficiency and compatibility, saves energy, and lowers operating cost.

Embodiments and aspects described herein are suitable for use in relatively large data centers having numerous equipment racks, as well as smaller or informal data centers and with facilities other than data centers. Estimations of branch circuit capacities and phase balance can become complex in high density data centers. Internal server instrumentation may provide information to a data center controller to identify power or cooling subsystem capacity. In various embodiments, such as those utilizing three phase power supplies or where server instrumentation is lacking, power distribution system instrumentation can provide information used to determine load consumption, available capacities, and phase balance. This information can be used by a data center controller to allocate or reallocate data center devices, subsystems, or equipment such as servers or virtual servers to or within one or more data centers. This improves data center power distribution and lowers operating cost.

Any references to front and back, left and right, top and bottom, and upper and lower are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references to "an embodiment", "some embodiments", "an alternate embodiment", "various embodiments", "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the objects, aims, and needs disclosed herein.

References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the spirit or essential characteristics thereof. For example, applications can be distributed between physical or dedicated servers without the use of virtual servers to adjust load distribution across the servers enabling certain data center devices, such as uninterruptable supplies or cooling units, to enter a shut down mode. Estimates of future load requirements allow these devices to reactivate from the shut down mode in time to receive applications or virtual servers at selected servers for execution. The foregoing embodiments are therefore to be considered in all respects illustrative rather than limiting of the described systems and methods. Scope of the systems and methods described herein is thus indicated by the appended claims, rather than the foregoing description, and all changes that come within the meaning and range of equivalency of the claims are therefore intended to be embraced therein.

What is claimed is:

1. A method of data center power supply control, the method executing on a computer including a processor and a memory, the method comprising:
   identifying, by the processor, a parameter of at least one of a plurality of servers that form at least part of a data center;
   identifying an estimated power draw of a virtual server and an estimated cooling requirement of the virtual server;
   determining an estimated power distribution from each phase of a plurality of phases of one or more polyphase power supplies to the plurality of servers;
   determining a phase balance between the plurality of phases based on the estimated power distribution from each phase of the plurality of phases;
   identifying a cooling capacity of a cooling unit;
   selecting one of the plurality of servers based at least in part on the parameter, the estimated power draw, the estimated cooling requirement, the phase balance between the plurality of phases, and the cooling capacity;
   generating a power request based at least in part on the estimated power draw;
   providing the virtual server to the selected server;
   adjusting an output of the cooling unit to the selected server based at least in part on the estimated cooling requirement; and
   adjusting the one or more polyphase power supplies to adjust power provided to at least one of the plurality of servers responsive to the power request.

2. The method of claim 1, wherein adjusting the one or more polyphase power supplies comprises:
   reversibly shutting down a portion of the one or more polyphase power supplies that provides power to at least one of the plurality of servers that is a different server than the selected server.

3. The method of claim 2, wherein shutting down the portion of the one or more polyphase power supplies comprises:
   shutting down at least one of a power distribution unit and a branch circuit of the one or more polyphase power supplies.

4. The method of claim 1, comprising:
   providing an application to the virtual server; and
   adjusting a parameter of the cooling unit to adjust a temperature of the selected server.

5. The method of claim 4, comprising:
   shutting down a portion of the cooling unit associated with at least one of the plurality of servers that is a different server than the selected server.

6. The method of claim 1, comprising:
   providing an application to the virtual server; and
   providing the requested amount of power to the selected server.

7. The method of claim 1, wherein at least one of the parameter, the estimated power draw, and the estimated cooling requirement include a simulated parameter; further comprising:
   selecting the one of the plurality of servers based at least in part on the simulated parameter.

8. The method of claim 1, comprising:
   determining an estimated life of at least one data center component based on at least one of the parameter, the estimated power draw, the estimated cooling requirement, and the estimated power distribution; and
   generating a data center maintenance schedule based on the estimated life.

9. The method of claim 1, wherein identifying the parameter further comprises:
   determining an estimated future power requirement of at least one of the plurality of servers for a period of time that is at least one of: less than one second, between one and ten seconds, and greater than ten seconds.

10. The method of claim 9, comprising:
    reactivating, responsive to the determined estimated future power requirement, at least a portion of the one or more polyphase power supplies from a shut down mode.

11. The method of claim 10, wherein providing the virtual server to the selected server includes relocating the virtual server from a first server of the plurality of servers to the selected server.

12. The method of claim 1, wherein selecting the one of the plurality of servers based at least in part on the phase balance includes selecting a server powered by a phase with a lowest estimated power distribution to improve the phase balance.

13. A data center power supply control system, comprising:
- a data center including a plurality of servers;
- one or more polyphase power supplies electrically coupled to the plurality of servers; and
- a data center controller connected to the plurality of servers, the data center controller being configured to:
  - identify a parameter of at least one of the plurality of servers;
  - identify an estimated power draw of a virtual server and an estimated cooling requirement of the virtual server;
  - estimate power distribution from each phase of a plurality of phases of the one or more polyphase power supplies to the plurality of servers and the virtual server;
  - determine a phase balance between the plurality of phases based on the estimated power distribution from each of the plurality of phases;
  - identify a cooling capacity of a cooling unit;
  - generate a power request based at least in part on the estimated power draw;
  - add the virtual server to a first server of one of the plurality of servers based at least in part on the parameter, the estimated power draw, the estimated cooling requirement, the cooling capacity, and the phase balance between the plurality of phases;
  - adjust an output of the cooling unit to the first server based at least in part on the estimated cooling requirement; and
  - adjust an amount of power provided from the one or more polyphase power supplies to the plurality of servers responsive to the power request.

14. The system of claim 13, wherein the data center controller is configured to reversibly shut down a portion of the one or more polyphase power supplies that distributes power to at least one of the plurality of servers.

15. The system of claim 14, wherein the portion of the one or more polyphase power supplies includes at least one of a power distribution unit and a branch circuit.

16. The system of claim 13, wherein:
- the estimated power draw of the virtual server includes an estimated amount of power to execute an application at the virtual server; wherein
- the data center controller is configured to provide the application to the virtual server; and wherein the one or more power polyphase supplies is configured to provide the estimated amount of power to the first server.

17. The system of claim 13, wherein the data center controller being configured to add the virtual server to the first server includes the data center controller being further configured to relocate the virtual server from a second server to the first server.

18. The system of claim 17, wherein the data center controller is configured to shut down a portion of the cooling associated with the second server.

19. The system of claim 13, wherein the data center controller is configured to adjust a parameter of the cooling unit to adjust a temperature of at least one of the plurality of servers.

20. The system of claim 13, wherein the data center controller is configured to adjust a parameter of the cooling unit to maintain a temperature of at least one of the plurality of servers.

21. The system of claim 13, the data center controller being configured to add the virtual server to the first server includes the data center controller being further configured to relocate the virtual server to the first server from a server of a second data center.

22. The system of claim 13, wherein at least one of the parameter, the estimated cooling requirement, the estimated power draw, and the estimated power distribution includes a simulated parameter; and
- wherein the data center controller is configured to add the virtual server to the first server based at least in part on the simulated parameter.

23. The system of claim 13, wherein the data center controller evaluates at least one of the parameter, the estimated cooling requirement, the estimated power draw, and the estimated power distribution to determine an estimated life of at least one data center component; and wherein the data center controller provides a data center maintenance schedule based at least in part on the estimated life.

24. The system of claim 13, wherein the parameter includes at least one of a measured parameter of at least one of the plurality of servers and an estimated future parameter of at least one of the plurality of servers.

25. The system of claim 24, wherein the estimated future parameter includes an estimated future power requirement of at least one of the plurality of servers for a period of time that is at least one of: less than one second, between one and ten seconds, and greater than ten seconds.

26. The system of claim 13, wherein the one or more polyphase power supplies include one or more polyphase uninterruptable power supplies.

27. A non-transitory computer readable medium having stored thereon sequences of instructions that, when executed by at least one processor, cause the at least one processor to:
- identify a parameter of at least one of a plurality of servers that form at least part of a data center;
- identify an estimated power draw of a virtual server and an estimated cooling requirement of the virtual server;
- determine estimated power distribution from each phase of a plurality of phases of one or more polyphase power supplies to the plurality of servers;
- determine a phase balance between the plurality of phases based on the estimated power distribution from each phase of the plurality of phases;
- identify a cooling capacity of a cooling unit;
- select one of the plurality of servers based at least in part on the parameter, the estimated power draw, the estimated cooling requirement, the cooling capacity, and the phase balance between the plurality of phases;
- generate a power request based at least in part on the estimated power draw;
- provide the virtual server to the selected server;
- adjust an output of the cooling unit to the selected server based at least in part on the estimated cooling requirement; and
- adjust the one or more polyphase power supplies to adjust power provided to at least one of the plurality of servers responsive to the power request.

28. A data center control system, comprising:
- a first data center including a first polyphase power supply and a second data center including a second polyphase power supply, each data center connected to a network, and each data center including a plurality of servers;
- a data center controller connected to the network and configured to:
  - identify parameters of the first data center and parameters of the second data center;
  - estimate power distribution of each phase of a first plurality of phases of the first polyphase power supply and each phase of a second plurality of phases of the second polyphase power supply;

determine a first phase balance between the first plurality of phases and a second phase balance between the second plurality of phases based on the estimated power distribution from each phase of the first and second plurality of phases;

identify an estimated power draw and an estimated cooling requirement for execution of an application on a virtual server;

identify a cooling capacity of a cooling unit;

evaluate the parameters of the first and second data centers, the first phase balance between the first plurality of phases, the second phase balance between the second plurality of phases, the cooling capacity, the estimated power draw, and the estimated cooling requirement;

generate a power request based at least in part on the evaluation; and transfer the virtual server from a first server of the first data center to a second server of the second data center based at least in part on the evaluation, wherein at least a portion of the first polyphase power supply coupled to the first server reversibly shuts down responsive to the transfer of the virtual server, the second polyphase power supply coupled to the second server is adjusted, and an output of the cooling unit to the second server is adjusted based at least in part on the estimated cooling requirement.

29. A method of data center control, the method executed on a computer comprising a processor and a memory, the method comprising:

identifying, by the processor, server parameters of first data center servers and server parameters of second data center servers;

determining estimated power distribution from each phase of a plurality of phases of one or more polyphase power supplies to the first data center servers and to the second data center servers;

determining a phase balance between the plurality of phases based on the estimated power distribution from each of the plurality of phases;

identifying an estimated power draw and an estimated cooling requirement for execution of an application on a virtual server;

identifying a cooling capacity of a cooling unit;

generating a power request based at least in part on the estimated power draw;

transferring the virtual server from a first server of the first data center to a second server of the second data center based at least in part on an evaluation of the server parameters of the first data center servers, the server parameters of the second data center servers, the cooling capacity, the estimated power draw, the phase balance between the plurality of phases, and the estimated cooling requirement;

reversibly shutting down at least part of the one or more polyphase power supplies coupled to the first server;

adjusting an output of the cooling unit to the second server based at least in part on the estimated cooling requirement; and adjusting the one or more polyphase power supplies coupled to the second server responsive to the power request.

* * * * *